United States Patent
Ishigami et al.

(10) Patent No.: US 8,466,409 B2
(45) Date of Patent: Jun. 18, 2013

(54) PHOTOELECTRIC CONVERSION MODULE FOR OPTICAL COMMUNICATION

(75) Inventors: Yoshiaki Ishigami, Hitachi (JP); Kenichi Tamura, Hitachi (JP); Masayuki Nikaido, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 378 days.

(21) Appl. No.: 12/840,732

(22) Filed: Jul. 21, 2010

(65) Prior Publication Data

US 2011/0031379 A1 Feb. 10, 2011

(30) Foreign Application Priority Data

Aug. 7, 2009 (JP) ................................. 2009-184954

(51) Int. Cl.
*H01J 40/14* (2006.01)
*H01J 5/02* (2006.01)

(52) U.S. Cl.
USPC ............... 250/239; 250/214.1; 250/214 R; 385/12; 361/736; 361/749; 398/135; 398/140

(58) Field of Classification Search
USPC ........... 250/239, 214.1, 214 R; 385/92, 147, 385/12, 13, 15; 361/748, 749, 752, 760, 761, 361/764, 767, 728, 736; 398/135, 140, 139
See application file for complete search history.

(56) References Cited

U.S. PATENT DOCUMENTS 8,057,109 B2 * 11/2011 Flens et al. .................. 385/92
2008/0226228 A1 * 9/2008 Tamura et al. ............... 385/33

FOREIGN PATENT DOCUMENTS

JP A-2008-090232 4/2008

* cited by examiner

*Primary Examiner* — Francis M Legasse, Jr.
(74) *Attorney, Agent, or Firm* — Scully, Scott, Murphy & Presser, P.C.

(57) ABSTRACT

A photoelectric conversion module includes a transmission side photoelectric conversion part for converting an electrical signal into an optical signal, a transmission side circuit board on which the transmission side photoelectric conversion part is mounted off-center to one side of the transmission side circuit board at one end of the transmission side circuit board, a reception side photoelectric conversion part for converting an optical signal into an electrical signal, and a reception side circuit board on which the reception side photoelectric conversion part is mounted off-center to one side of the reception side circuit board at one end of the reception side circuit board. A surface of the transmission side circuit board on which the transmission side photoelectric conversion part is mounted is opposite to a surface of the reception side circuit board on which the reception side photoelectric conversion part is mounted.

5 Claims, 16 Drawing Sheets

2 TRANSMISSION SIDE PHOTOELECTRIC CONVERSION PART
3 RECEPTION SIDE PHOTOELECTRIC CONVERSION PART
4 TRANSMISSION SIDE CIRCUIT BOARD
5 RECEPTION SIDE CIRCUIT BOARD

2 TRANSMISSION SIDE PHOTOELELCTRIC CONVERSION PART
3 RECEPTION SIDE PHOTOELECTRIC CONVERSION PART
4 TRANSMISSION SIDE CIRCUIT BOARD
5 RECEPTION SIDE CIRCUIT BOARD
6,7 BASE MEMBER
10 SPACER
13 CONNECTOR

2 TRANSMISSION SIDE PHOTOELELCTRIC CONVERSION PART
4 TRANSMISSION SIDE CIRCUIT BOARD
5 RECEPTION SIDE CIRCUIT BOARD
6, 7 BASE MEMBER
10 SPACER
13 CONNECTOR

2 TRANSMISSION SIDE PHOTOELELCTRIC CONVERSION PART
3 RECEPTION SIDE PHOTOELECTRIC CONVERSION PART
4 TRANSMISSION SIDE CIRCUIT BOARD
5 RECEPTION SIDE CIRCUIT BOARD
6, 7 BASE MEMBER
10 SPACER
13 CONNECTOR

2 TRANSMISSION SIDE PHOTOELELCTRIC CONVERSION PART
4 TRANSMISSION SIDE CIRCUIT BOARD
6 BASE MEMBER

2 TRANSMISSION SIDE PHOTOELELCTRIC CONVERSION PART
4 TRANSMISSION SIDE CIRCUIT BOARD
6 BASE MEMBER
30 LIGHT-EMITTING ELEMENT ARRAY
32a LENS BLOCK

3 RECEPTION SIDE PHOTOELELCTRIC CONVERSION PART
5 RECEPTION SIDE CIRCUIT BOARD
7 BASE MEMBER

3 RECEPTION SIDE PHOTOELELCTRIC CONVERSION PART
5 RECEPTION SIDE CIRCUIT BOARD
7 BASE MEMBER
32b LENS BLOCK
43 LIGHT-RECEIVING ELEMENT ARRAY

| 4 TRANSMISSION SIDE CIRCUIT BOARD |
| 10 SPACER |
| 13 CONNECTOR |

| 81,82 BASE MEMBER |
| 81c,82c SECOND EXTENSION PORTION |
| 21a,21b HEAT-DISSIPATING SHEET |

2 TRANSMISSION SIDE PHOTOELECTRIC CONVERSION PART
3 RECEPTION SIDE PHOTOELECTRIC CONVERSION PART
4 TRANSMISSION SIDE CIRCUIT BOARD
5 RECEPTION SIDE CIRCUIT BOARD

2 TRANSMISSION SIDE PHOTOELECTRIC CONVERSION PART
4 TRANSMISSION SIDE CIRCUIT BOARD
5 RECEPTION SIDE CIRCUIT BOARD

2 TRANSMISSION SIDE PHOTOELECTRIC CONVERSION PART
3 RECEPTION SIDE PHOTOELECTRIC CONVERSION PART
4 TRANSMISSION SIDE CIRCUIT BOARD
5 RECEPTION SIDE CIRCUIT BOARD

| 2 TRANSMISSION SIDE PHOTOELECTRIC CONVERSION PART |
| 3 RECEPTION SIDE PHOTOELECTRIC CONVERSION PART |
| 4 TRANSMISSION SIDE CIRCUIT BOARD |
| 5 RECEPTION SIDE CIRCUIT BOARD |

PHOTOELECTRIC CONVERSION MODULE FOR OPTICAL COMMUNICATION

The present application is based on Japanese patent application No. 2009-184954 filed on Aug. 7, 2009, the entire contents of which are incorporated herein by reference.

BACKGROUND OF THE INVENTION

1. Field of the Invention

This invention relates to a photoelectric conversion module and, in particular, a photoelectric conversion module adapted for multiple channels.

2. Description of the Related Art

Recently, in accordance with speeding up of communications, a high-speed transmission I/O interface (I/O architecture) such as InfiniBand and PCI Express (which are registered trademarks in USA) is put to practical use. The high-speed transmission I/O interface (I/O architecture) can provide a high-speed by bundling multiple channels.

In general, a photoelectric conversion module used for the I/O interface is constructed such that an optical transmission assembly (or transmission side photoelectric conversion part) and an optical reception assembly (or reception side photoelectric conversion part) are mounted on one circuit board (See, e.g., JP-A-2008-90232).

The photoelectric conversion module includes a card edge connector that a connecting terminal is for lied at one end of a circuit board for electrical connection to an information system device to be connected therethrough, where the card edge connector is fitted to a card edge socket on the information system device.

However, in the conventional photoelectric conversion module, the connecting terminals for transmission and reception need to be formed at one end of one circuit board since the transmission side photoelectric conversion part and the reception side photoelectric conversion part are mounted on the one circuit board. As the number of the channels increases, the number of connecting terminals increases to widen the width of the card edge connector. There occurs the problem that the size of the card edge connector increases.

For example, a photoelectric conversion module adapted for 12-channel bidirectional communications (12 channels for transmission and 12 channels for reception) needs 48 connecting terminals for transmission and reception since two connecting terminals are needed for each one channel to allow transmission with differential electrical signal. In this case, the card edge connector of the conventional photoelectric conversion module needs at least a width for 24 connecting terminals even when the connecting terminals are formed on both sides of the circuit board. Therefore, the width of the card edge connector increases such that the photoelectric conversion module becomes larger.

In order to decrease the width of the card edge connector, a construction may be made that two circuit boards of a transmission side circuit board and a reception side circuit board are used to form a double card edge connector by mounting the connecting terminals on the respective circuit boards.

In accordance with the I/O interface standards, the double card edge connectors for transmission and reception need to have a predetermined clearance to match the dimensions of an edge connector socket to be connected. Furthermore, the entire photoelectric conversion module needs to have predetermined dimensions in vertical and horizontal widths.

Thus, it is necessary for the photoelectric conversion module with the two circuit boards composed of the transmission side circuit board and the reception side circuit board to be downsized while allowing the entire photoelectric conversion module to have predetermined dimensions in vertical and horizontal widths.

SUMMARY OF THE INVENTION

It is an object of the invention to provide a photoelectric conversion module that can be downsized when it is composed of a transmission side circuit board and a reception side circuit board to be adapted for multiple channels.

(1) According to one embodiment of the invention, a photoelectric conversion module comprises:

a transmission side photoelectric conversion part for converting an electrical signal into an optical signal;

a transmission side circuit board on which the transmission side photoelectric conversion part is mounted off-center to one side of the transmission side circuit board at one end of the transmission side circuit board;

a reception side photoelectric conversion part for converting an optical signal into an electrical signal; and a reception side circuit board on which the reception side photoelectric conversion part is mounted off-center to one side of the reception side circuit board at one end of the reception side circuit board, wherein a surface of the transmission side circuit board on which the transmission side photoelectric conversion part is mounted is opposite to a surface of the reception side circuit board on which the reception side photoelectric conversion part is mounted.

In the above embodiment (1) of the invention, the following modifications and changes can be made.

(i) The transmission side photoelectric conversion part comprises a light-emitting element and a first lens block to which the light-emitting element is optically coupled for converting an optical path, the reception side photoelectric conversion part comprises a light-receiving element and a second lens block to which the light-receiving element is optically coupled for covering an optical path, and the first lens block of the transmission side photoelectric conversion part is disposed parallel to the second lens block of the reception side photoelectric conversion part.

(ii) The photoelectric conversion module further comprises:

a first base member fixed to the one end of the transmission side circuit board, for mounting thereon the transmission side photoelectric conversion part off-center to the one side of the transmission side circuit board; and a second base member fixed to the one end of the reception side circuit board, for mounting thereon the reception side photoelectric conversion part off-center to the one side of the reception side circuit board.

(iii) The transmission side circuit board comprises a first card edge connector with a connecting terminal at another end thereof, the reception side circuit board comprises a second card edge connector with a connecting terminal at another end thereof, and the first card edge connector and the second card edge connector form a double card edge connector in a vertical direction.

(iv) The photoelectric conversion module further comprises:

a spacer that is disposed between the transmission side circuit board and the reception side circuit board, for retaining a predetermined clearance therebetween.

POINTS OF THE INVENTION

According to one embodiment of the invention, a photoelectric conversion module is constructed such that a transmission side photoelectric conversion part is mounted off-center to one side of a transmission side circuit board and, likewise, a reception side photoelectric conversion part is mounted off-center to one side of a reception side circuit board, so that a surface on which the transmission side photoelectric conversion part is mounted is opposite to a surface on which the reception side photoelectric conversion part is mounted. Thereby, the transmission side photoelectric conversion part and the reception side photoelectric conversion part can be disposed parallel in the width direction without interfering with each other between the transmission side circuit board and the reception side circuit board.

BRIEF DESCRIPTION OF THE DRAWINGS

The preferred embodiments according to the invention will be explained below referring to the drawings, wherein:

FIGS. 16A to 16C show a photoelectric conversion module in a second preferred embodiment according to the invention, wherein FIG. 16A is a perspective view showing a lower housing with a transmission side circuit board and a reception circuit board (with a spacer disposed therebetween) mounted thereon, FIG. 16B is an enlarged side view showing a main part of the transmission side circuit board and a transmission side photoelectric conversion part, and FIG. 16C is an enlarged side view showing a main part of the reception side circuit board and a reception side photoelectric conversion part;

DETAILED DESCRIPTION OF THE PREFERRED EMBODIMENTS

The preferred embodiments of the invention will be explained below referring to the attached drawings.

In the embodiments, as an example, a photoelectric conversion module adapted for 8-channel bidirectional communications (i.e., 8 channels for transmission and 8 channels for reception) is exemplified. The number of channels is not limited to this. For example, 12-channel bidirectional communications (i.e., 12 channels for transmission and 12 channels for reception) or 4-channel bidirectional communications (i.e., 4 channels for transmission and 4 channels for reception) may be used.

First Embodiment

Photoelectric Conversion Module

Figure 1:
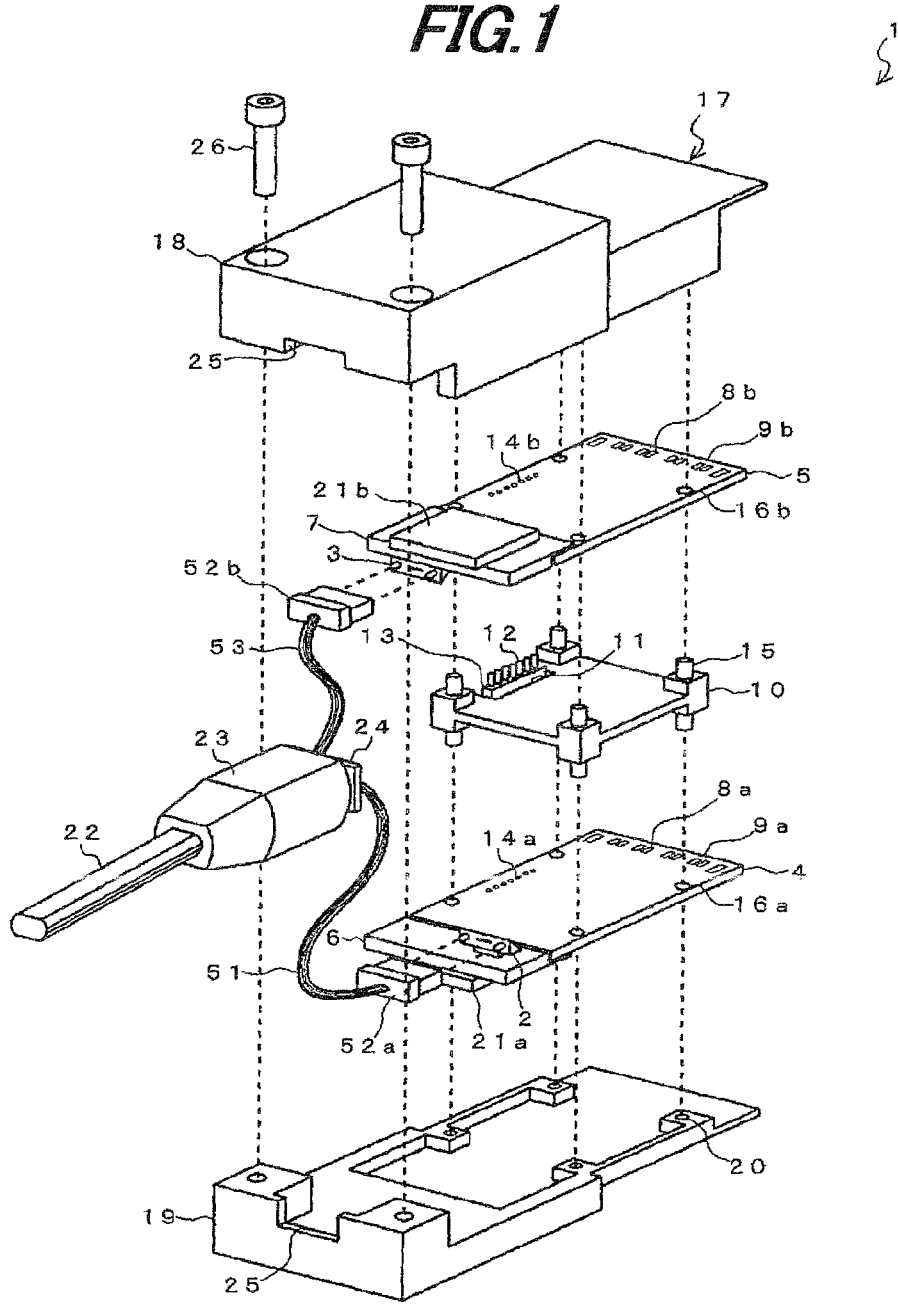
FIG. 1 is an exploded perspective view showing a photoelectric conversion module in a first preferred embodiment according to the invention.
Figure 2:
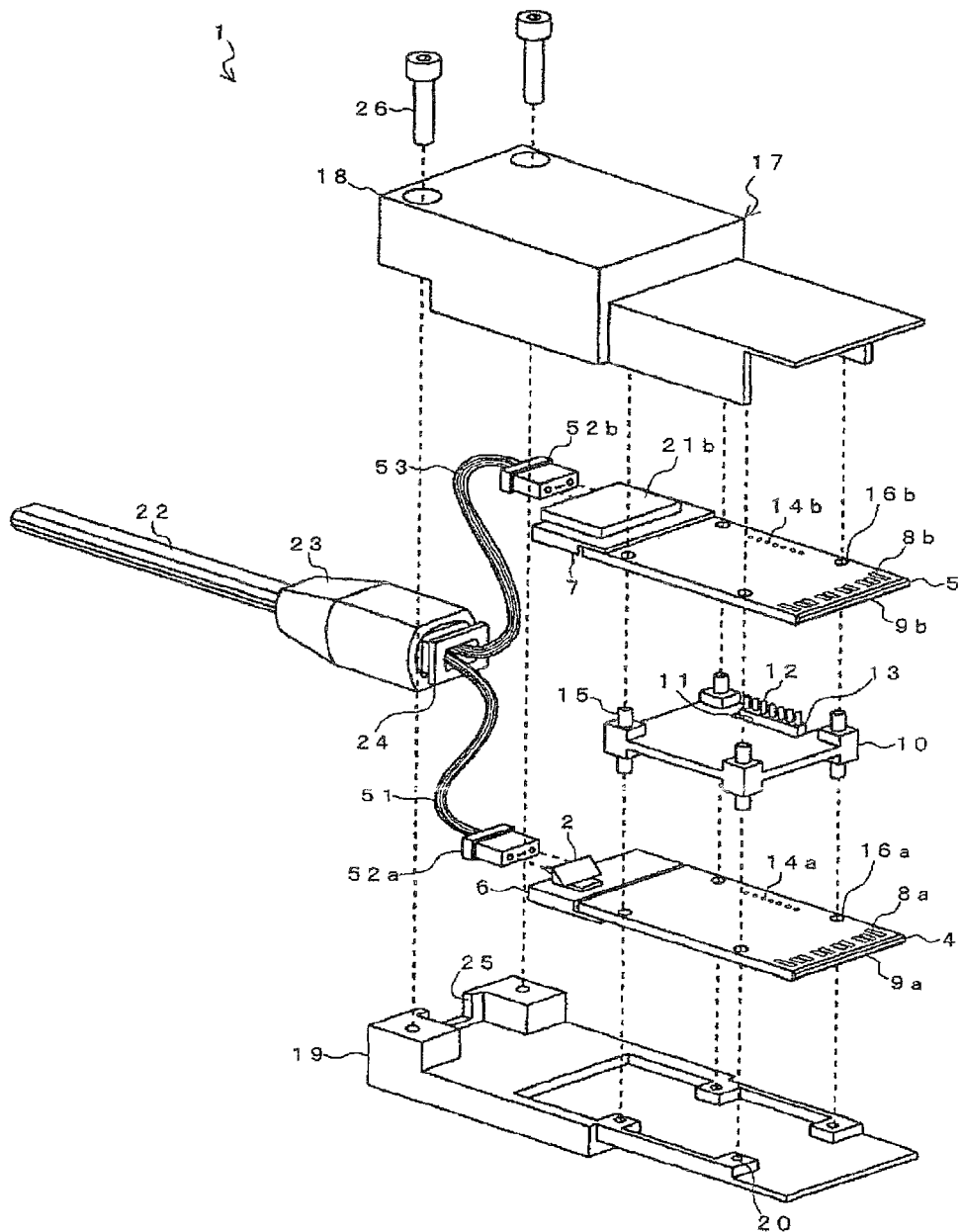
FIG. 2 is an exploded perspective view showing the photoelectric conversion module in FIG. 1 in another direction.
Figure 3:
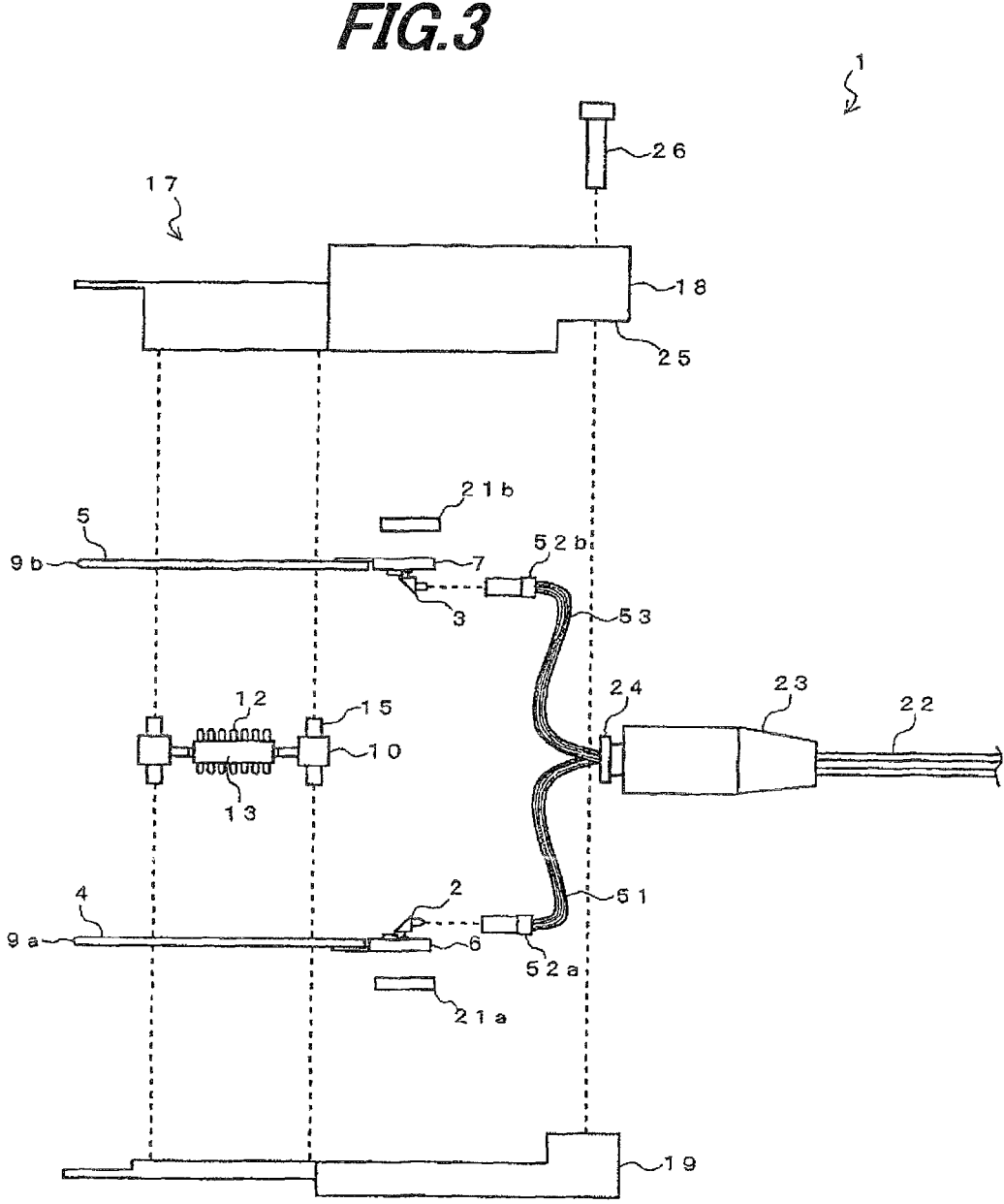
FIG. 3 is an exploded side view showing the photoelectric conversion module in FIG. 1.
Figure 4A:
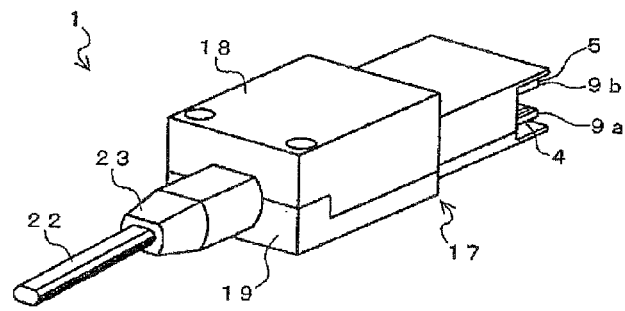
FIGS. 4A and 4B are perspective views showing the photoelectric conversion module in FIG. 1.
Figure 4B:
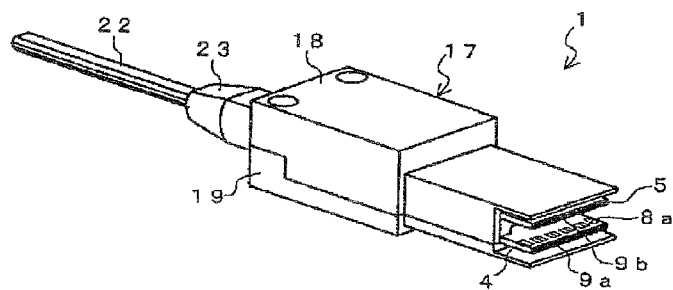
Figure 5A:
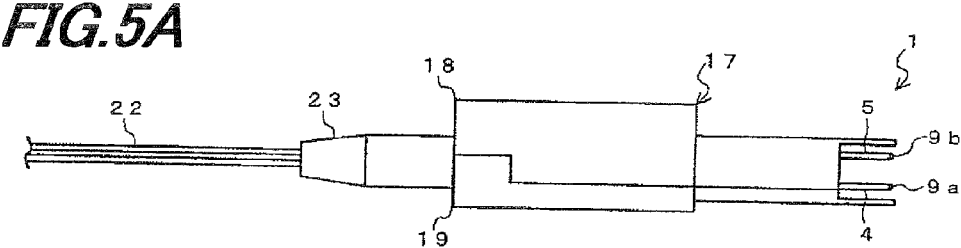
FIG. 5A is a side view showing the photoelectric conversion module in FIG. 1.
Figure 5B:
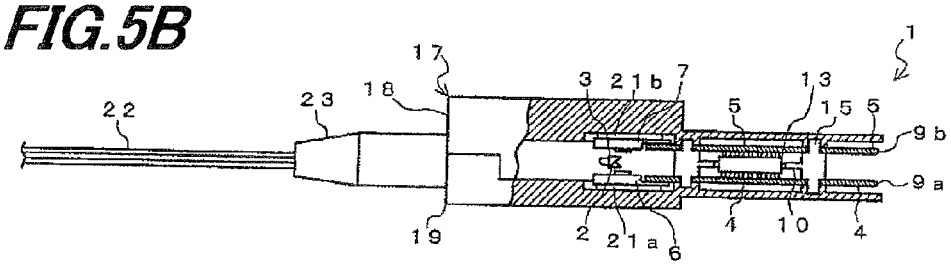
FIG. 5B is a partial cross sectional view showing the photoelectric conversion module in FIG. 5A.

FIGS. 1 and 2 are exploded perspective views showing a photoelectric conversion module in the first embodiment according to the invention. FIG. 3 is an exploded side view showing the photoelectric conversion module. FIGS. 4A and 4B are perspective views showing the photoelectric conversion module. FIG. 5A is a side view showing the photoelectric conversion module. FIG. 5B is a partial cross sectional view showing the photoelectric conversion module.

As shown in FIGS. 1 to 5B, the photoelectric conversion module 1 is comprised of a transmission side circuit board 4 in which connecting terminals 8a are formed at one end and a base member 6 with a transmission side photoelectric conversion part 2 mounted thereon is attached at the other end (i.e., at an end opposite to the one end), a reception side circuit board 5 in which connecting terminals 8b are formed at one end and a base member 7 with a reception side photoelectric conversion part 3 mounted thereon is attached at the other end, a spacer 10 disposed between the transmission side circuit board 4 and the reception side circuit board 5 for providing a predetermined clearance therebetween, a connector 13 for electrically connecting the transmission side circuit board 4 and the reception side circuit board 5, and a housing 17 composed of an upper housing 18 and a lower housing 19 for encompassing the transmission side circuit board 4, the reception side circuit board 5, the spacer 10 and the connector 13.

The transmission side circuit board 4 and the reception side circuit board 5 are disposed vertically such that the surface of the transmission side circuit board 4 for mounting the transmission side photoelectric conversion part 2 is opposite to the surface of the reception side circuit board 5 for mounting the reception side photoelectric conversion part 3.

An optical fiber cable 22 is fixed to the housing 17. At one end (i.e., at right end in FIGS. 1 and 2) thereof, the optical fiber cable 22 is divided into transmission side optical fibers 51 and reception side optical fibers 53. An MT ferrule 52a is attached to the end of the transmission side optical fibers 51. The MT ferrule 52a is optically coupled to the transmission side photoelectric conversion part 2. An MT ferrule 52b is attached to the end of the reception side optical fibers 53. The MT ferrule 52b is optically coupled to the reception side photoelectric conversion part 3.

As shown in FIGS. 4A to 5B, the transmission side circuit board 4 and the reception side circuit board 5 are disposed stacked vertically with a predetermined clearance therebetween. The photoelectric conversion module 1 is constructed such that at one end thereof (i.e., at right end in FIGS. 4A to 5B), a transmission side card edge connector 9a with the connecting terminals 8a formed at one end of the transmission side circuit board 4 and a reception side card edge connector 9b with the connecting terminals 8b formed at one end of the reception side circuit board 5 are disposed with a predetermined clearance therebetween. Thus, the photoelectric conversion module 1 is comprised of the double card edge connectors 9a, 9b at one end thereof. The card edge connectors 9a, 9b at one end of the photoelectric conversion module 1 are inserted and electrically connected to an edge connector socket of a connected device. Although in this embodiment the transmission side circuit board 4 and the reception side circuit board 5 are disposed downward and upward, respectively, they may be disposed upside down.

The optical fiber cable 22 is fixed to the other end of the photoelectric conversion module 1. The photoelectric conversion module 1 may be fixed to both ends of the optical fiber cable 22.

The photoelectric conversion module 1 is used to make electrical connection between devices such as servers. For example, using the optical fiber cable 22 with the photoelectric conversion modules at both ends thereof, the photoelectric conversion module 1 at one end is connected to one of the devices and the photoelectric conversion module 1 at the other end is connected to the other of the devices such that the devices are connected to each other.

In the operation of the photoelectric conversion module 1, electrical signal from a connected device is inputted through the connecting terminals 8a to the transmission side circuit board 4, the electrical signal is converted into optical signal by the transmission side photoelectric conversion part 2, and the optical signal is outputted to the transmission side optical fiber 51. Optical signal through the reception side optical fiber 53 is converted into electrical signal by the reception side photoelectric conversion part 3, and the electrical signal is outputted through the wiring pattern and the connecting terminals 8b of the reception side circuit board 5 to the connected device.

The photoelectric conversion module 1 is adapted for transmitting signals at 10 Gb/s per one channel. In this embodiment adapted for eight-channel bidirectional communications, transmit and receive signals are sent at 80 Gb/s.

Transmission Side Circuit Board/Transmission Side Photoelectric Conversion Part

Figure 6A:
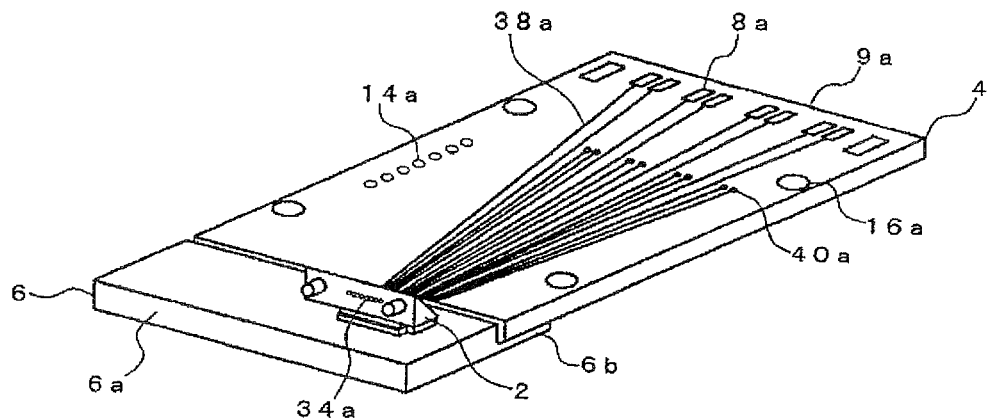
FIG. 6A is a perspective view (from above) showing a transmission side circuit board used in the photoelectric conversion module in FIG. 1.
Figure 6B:
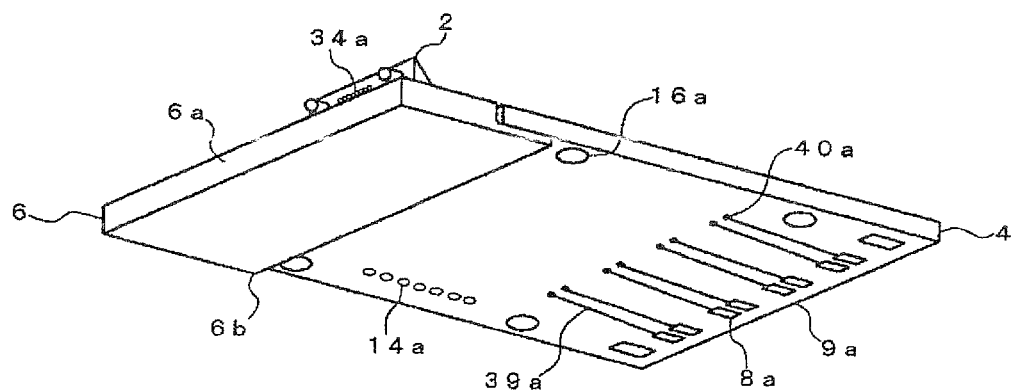
FIG. 6B is a perspective view (from below) showing the transmission side circuit board in FIG. 6A.
Figure 7A:
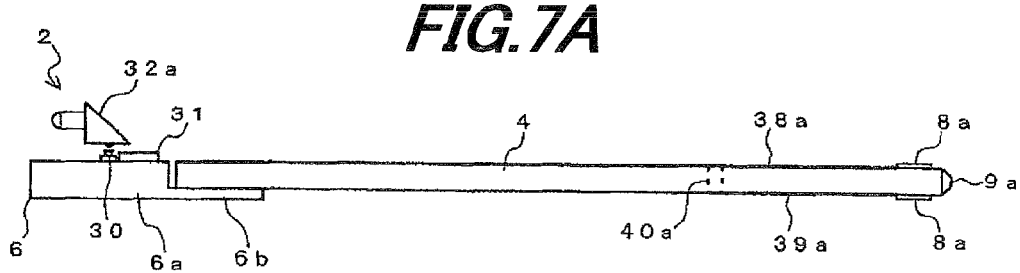
FIG. 7A is a side view showing the transmission side circuit board and a transmission side photoelectric conversion part.
Figure 7B:
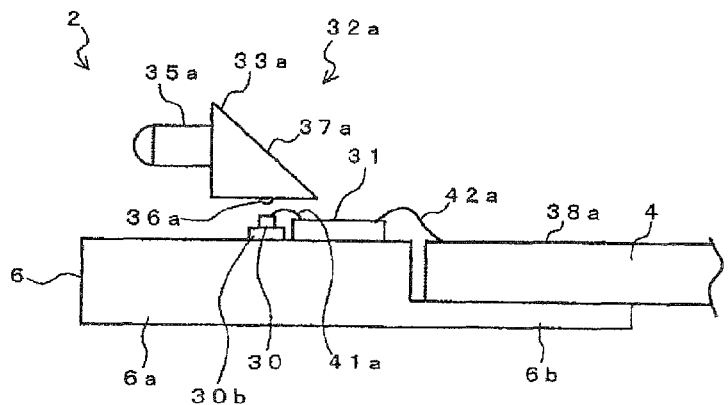
FIG. 7B is an enlarged side view showing a main part of FIG. 7A.

FIGS. 6A and 6B show the transmission side circuit board 4 and the transmission side photoelectric conversion part 2 in perspective view. FIGS. 7A and 7B show the transmission side circuit board 4 and the transmission side photoelectric conversion part 2 in side view.

The transmission side circuit board 4 is formed of, e.g., a multilayer substrate. On the surface of one end of the transmission side circuit board 4, the eight connecting terminals 8a are formed (See FIG. 6A). At both sides of the eight connecting terminals 8a, two connecting terminals are formed as a power terminal and a ground terminal, respectively. Likewise, on the bottom surface of one end of the transmission side circuit board 4, the eight connecting terminals 8a are formed (See FIG. 6B). At both sides of the eight connecting terminals 8a, two connecting terminals are formed as a power terminal and a ground terminal, respectively. Two of the connecting terminals 8a correspond to one channel for differential signal. The 16 connecting terminals 8a in total on both surfaces are adapted for eight channels.

The transmission side circuit board 4 has at one end thereof the connecting terminals 8a to form the card edge connector 9a to be fitted into the edge connector socket of a connected device.

The transmission side circuit board 4 has a positioning hole 16a into which a positioning pin 15 of the spacer 10 is inserted. The positioning holes 16a are formed, four in total, i.e., two near at one side (i.e., a upper-left side in FIG. 6A) of the transmission side circuit board 4 on one end side and the other end side thereof, and two near at another side (i.e., a lower-right side in FIG. 6A) of the transmission side circuit board 4 on one end side and the other end side thereof.

Further, the transmission side circuit board 4 has seven through-holes 14a for inserting a conductor pin 12 of the connector 13 thereinto near at the center of one side (i.e., a upper-left side in FIG. 6A) of the transmission side circuit board 4.

The transmission side circuit board 4 has on its surface wiring patterns 38a for interconnecting the connecting terminals 8a and the transmission side photoelectric conversion part 2. Also, the transmission side circuit board 4 has wiring patterns 39a on its back surface. As shown in FIGS. 6B and 7A, the wiring patterns 39a on the back surface are electrically connected via through-holes 40a to the wiring patterns 38a on the surface.

As shown in FIGS. 7A and 7B, the transmission side photoelectric conversion part 2 is comprised of a light-emitting element array (e.g., VCSEL array) 30, a driver IC 31 for driving the light-emitting element array 30, and a lens block 32a disposed above the light-emitting element array 30. The light-emitting element array 30 is comprised of eight light-emitting elements. The light-emitting element array 30 is mounted on the base member 6 via a submount 30b.

The lens block 32a is comprised of an orthogonal optical path lens 33a formed nearly a triangle pole and having a reflecting surface 37a, a lens 34a (See FIGS. 6A and 6B) formed on the front face (leftward in FIG. 7B) of the orthogonal optical path lens 33a, fitting pins 35a protruding from the front face of the orthogonal optical path lens 33a, and lenses 36a formed on the bottom surface of the orthogonal optical path lens 33a and arranged to match the optical axis of the light-emitting element array 30. The lens block 32a is fixed to the base member 6 by a member (not shown).

As shown in FIG. 7B, the light-emitting element array 30 is electrically connected through a wire 41a to the driver IC 31. The driver IC 31 is electrically connected through a wire 42a to the wiring pattern 38a formed on the surface of the transmission side circuit board 4.

Although not shown, a microcomputer is mounted on the back surface of the transmission side circuit board 4. The microcomputer is electrically connected to the driver IC 31 and an amplifier IC 44 (See FIG. 10A) of the reception side circuit board 5 to control them. The microcomputer and the amplifier IC 44 are electrically connected to each other through the connector 13 for electrically connecting the transmission side circuit board 4 and the reception side circuit board 5. The microcomputer is desirably mounted on the transmission side circuit board 4 since it controls mainly the driver IC 31 (e.g., setting of the driver IC 31).

In this embodiment, the base member 6 is attached on the other end of the transmission side circuit board 4, and the transmission side photoelectric conversion part 2 is mounted on the base member 6.

The base member 6 is comprised of a plate base portion 6a and an extension portion 6b integrated with the base portion 6a, extending from the lower part (i.e., a part on the bottom of the base portion 6a) of the base portion 6a, having a thickness less than the base portion 6a, and is formed nearly L-shaped in side view. The base member 6 is formed flat on the side of the back surface (downward in FIG. 7A) and stepwise between the base portion 6a and the extension portion 6b on the side of the top surface (upward in FIG. 7A).

The base member 6 is of a conductive member, e.g., a metal such as copper tungsten (Cu—W) alloy and kovar.

On the surface of the base portion 6a of the base member 6, the submount 30b with the light-emitting element array 30 mounted thereon and the driver IC 31 are adhered by a conductive adhesive. Also, on the surface of the base portion 6a of the base member 6, the lens block 32a is fixed by a member (not shown).

On the surface of the extension portion 6b of the base member 6, the back surface of the other end of the transmission side circuit board 4 is fixed by adhesive.

The base member 6 is electrically connected to a ground pattern (not shown) formed as an inner layer of the transmission side circuit board 4.

In this embodiment, the transmission side photoelectric conversion part 2 is mounted off-center to another side (i.e., a lower-right side in FIG. 6A) in the width direction (i.e., the direction from upper-left to lower-right in FIG. 6A) of the transmission side circuit board 4. In other words, the transmission side photoelectric conversion part 2 is mounted on the base member 6 such that its entirety is located on the side of another side (i.e., a lower-right side in FIG. 6A) off (or away from) the center line (or axis) of the transmission side circuit board 4 in the width direction. Alternatively, the transmission side photoelectric conversion part 2 may be mounted off-center to one side (i.e., a upper-left side in FIG. 6A) in the width direction (i.e., the direction from upper-left to lower-right in FIG. 6A) of the transmission side circuit board 4.

Reception Side Circuit Board/Reception Side Photoelectric Conversion Part

Figure 9A:
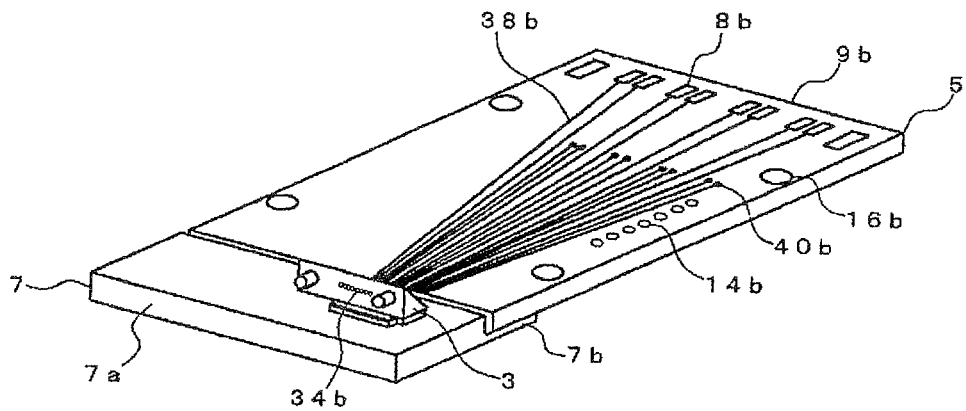
FIG. 9A is a perspective view (from above) showing a reception side circuit board used in the photoelectric conversion module in FIG. 1.
Figure 9B:
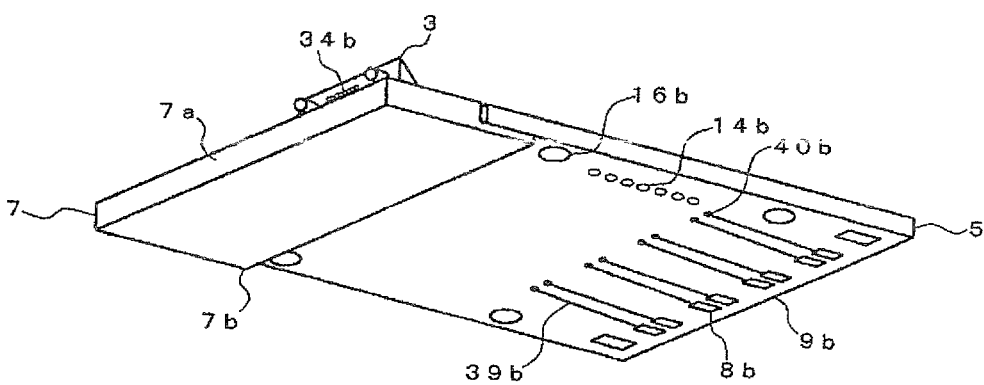
FIG. 9B is a perspective view (from below) showing the reception side circuit board in FIG. 9A.
Figure 10A:
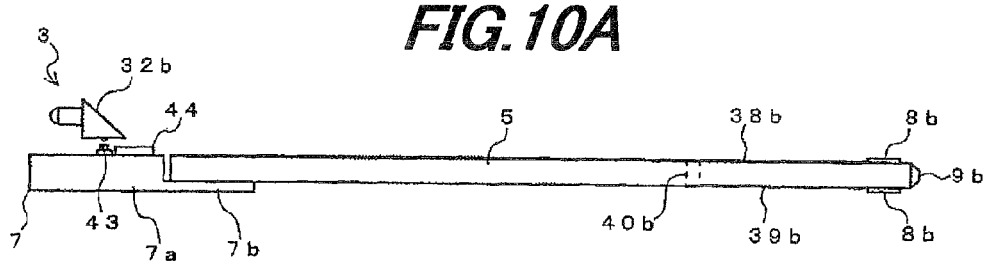
FIG. 10A is a side view showing the reception side circuit board and a reception side photoelectric conversion part.
Figure 10B:
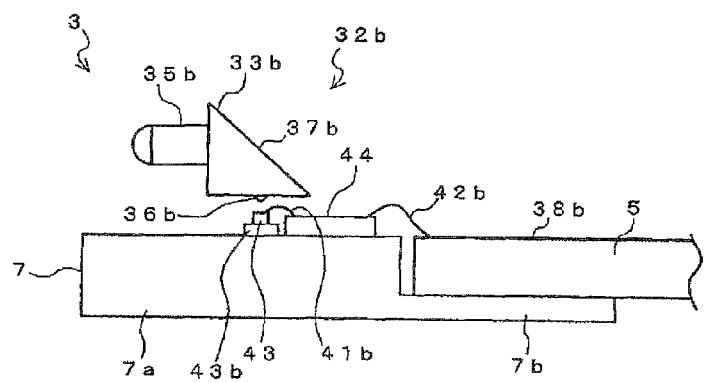
FIG. 10B is an enlarged side view showing a main part of FIG. 10A.

FIGS. 9A and 9B show the reception side circuit board 5 and the reception side photoelectric conversion part 3 in perspective view. FIGS. 10A and 10B show the reception side circuit board 5 and the reception side photoelectric conversion part 3 in side view.

The reception side circuit board 5 is formed of, e.g., a multilayer substrate. On the surface of one end of the reception side circuit board 5, the eight connecting terminals 8b are formed (See FIG. 9A). At both sides of the eight connecting terminals 8b, two connecting terminals are formed as a power terminal and a ground terminal, respectively. Likewise, on the bottom surface of one end of the reception side circuit board 5, the eight connecting terminals 8b are formed (See FIG. 9B). At both sides of the eight connecting terminals 8b, two connecting terminals are formed as a power terminal and a ground terminal, respectively. Two of the connecting terminals 8b correspond to one channel for differential signal. The 16 connecting terminals 8b in total on both surfaces are adapted for eight channels.

The reception side circuit board 5 has at one end thereof the connecting terminals 8b to form the card edge connector 9b to be fitted into the edge connector socket of a connected device.

The reception side circuit board 5 has a positioning hole 16b into which the positioning pin 15 of the spacer 10 is inserted. The positioning holes 16b are formed, four in total, i.e., two near at one side (i.e., a upper-left side in FIG. 9A) of the reception side circuit board 5 on one end side and the other end side thereof, and two near at another side (i.e., a lower-right side in FIG. 9A) of the reception side circuit board 5 on one end side and the other end side thereof.

Further, the reception side circuit board 5 has seven through-holes 14b for inserting the conductor pin 12 of the connector 13 thereinto near at the center of one side (i.e., a lower-right side in FIG. 9A) of the reception side circuit board 5.

The reception side circuit board 5 has on its surface wiring patterns 38b for interconnecting the connecting terminals 8b and the reception side photoelectric conversion part 3. Also, the reception side circuit board 5 has wiring patterns 39b on its back surface. As shown in FIGS. 9B and 10A, the wiring patterns 39b on the back surface are electrically connected via through-holes 40b to the wiring patterns 38b on the surface.

As shown in FIGS. 10A and 10B, the reception side photoelectric conversion part 3 is comprised of a light-receiving element array (e.g., PD array) 43, an amplifier IC 44 for amplifying electrical signals from the light-receiving element array 43, and a lens block 32b disposed above the light-receiving element array 43. The light-receiving element array 43 is comprised of eight light-receiving elements. The light-receiving element array 43 is mounted on the base member 7 via a submount 43b.

The lens block 32b is comprised of an orthogonal optical path lens 33b formed nearly a triangle pole and having a reflecting surface 37b, a lens 34b (See FIGS. 9A and 9B) formed on the front face (leftward in FIG. 10B) of the orthogonal optical path lens 33b, fitting pins 35b protruding from the front face of the orthogonal optical path lens 33b, and lenses 36b formed on the bottom surface of the orthogonal optical path lens 33b and arranged to match the optical axis of the light-receiving element array 43. The lens block 32b is fixed to the base member 7 by a member (not shown).

As shown in FIG. 10B, the light-receiving element array 43 is electrically connected through a wire 41b to the amplifier IC 44. The amplifier IC 44 is electrically connected through a wire 42b to the wiring pattern 38b formed on the surface of the reception side circuit board 5.

In this embodiment, the base member 7 is attached on the other end of the reception side circuit board 5, and the reception side photoelectric conversion part 3 is mounted on the base member 7.

The base member 7 is comprised of a plate base portion 7a and an extension portion 7b integrated with the base portion 7a, extending from the lower part (i.e., a part on the bottom of the base portion 7a) of the base portion 7a, having a thickness less than the base portion 7a, and is formed nearly L-shaped in side view. The base member 7 is formed flat on the side of the back surface (downward in FIG. 10A) and stepwise between the base portion 7a and the extension portion 7b on the side of the top surface (upward in FIG. 10A).

The base member 7 is of a conductive member, e.g., a metal such as copper tungsten (Cu—W) alloy and kovar.

On the surface of the base portion 7a of the base member 7, the submount 43b with the light-receiving element array 43 mounted thereon and the amplifier IC 44 are adhered by a conductive adhesive. Also, on the surface of the base portion 7a of the base member 7, the lens block 32b is fixed by a member (not shown).

On the surface of the extension portion 7b of the base member 7, the back surface of the other end of the reception side circuit board 5 is fixed by adhesive. The base member 7 is electrically connected to a ground pattern (not shown) formed as an inner layer of the reception side circuit board 5.

In this embodiment, like the arrangement of the transmission side photoelectric conversion part 2 of the transmission side circuit board 4, the reception side photoelectric conversion part 3 is mounted off-center to another side (i.e., a lower-right side in FIG. 9A) in the width direction (i.e., the direction from upper-left to lower-right in FIG. 9A) of the reception side circuit board 5. In other words, the reception side photoelectric conversion part 3 is mounted on the base member 7 such that its entirety is located on the side of another side (i.e., a lower-right side in FIG. 9A) from the center of the reception side circuit board 5 in the width direction. Alternatively, where the transmission side photoelectric conversion part 2 is mounted off-center to one side (i.e., a upper-left side in FIG. 6A) in the width direction (i.e., the direction from upper-left to lower-right in FIG. 6A) of the transmission side circuit board 4, the reception side photoelectric conversion part 3 is likewise mounted off-center to one side (i.e., a upper-left side in FIG. 9A) in the width direction (i.e., the direction from upper-left to lower-right in FIG. 9A) of the reception side circuit board 5.

Connector

Figure 12A:
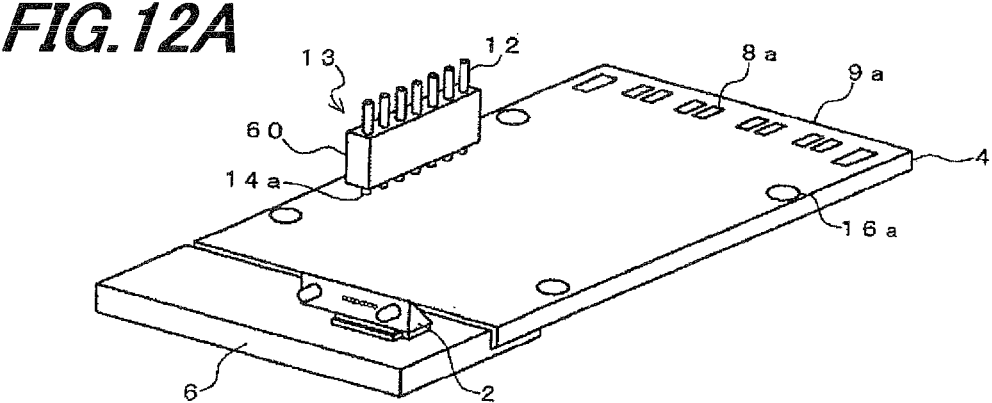
FIG. 12A is a perspective view showing the transmission side circuit board in FIG. 6 with a connector attached thereto.
Figure 12B:
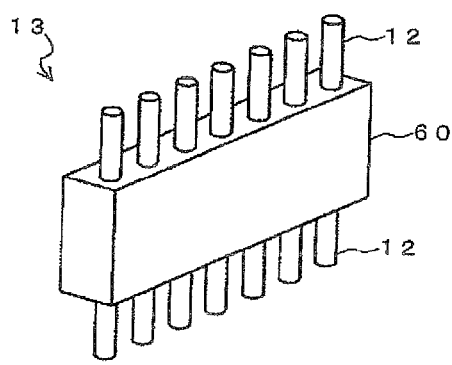
FIG. 12B is a perspective view showing the connector in FIG. 12A.

FIG. 12B shows the connector 13. The connector 13 serves to electrically connect the transmission side circuit board 4 and the reception side circuit board 5. The connector 13 is comprised of a rectangular-solid main body 60 with plural conductor pins (seven pins in the embodiment) 12 protruding vertically. The connector 13 is made by integrally forming the main body 60 by resin molding with the seven conductor pins arranged therein.

FIG. 12A shows the transmission side circuit board 4 with the connector 13 connected thereto in perspective view. The connector 13 is electrically connected to the transmission side circuit board 4 by inserting the conductor pins 12 into the through-holes 14a and soldering them thereto. The same applies to the reception side circuit board 5.

In this embodiment, the connector 13 is used for electrically connecting the transmission side circuit board 4 and the reception side circuit board 5. Alternatively, a flexible printed circuit board or a cable array etc. may be used for electrically connecting the transmission side circuit board 4 and the reception side circuit board 5.

Spacer

Figure 13:
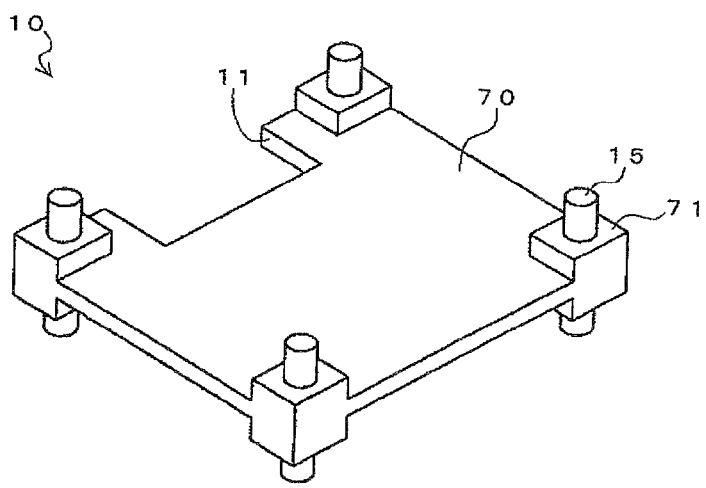
FIG. 13 is a perspective view showing a spacer used in the photoelectric conversion module in FIG. 1.

FIG. 13 shows the spacer 10. The spacer 10 is a member for retaining a predetermined clearance between the transmission side circuit board 4 and the reception side circuit board 5. The spacer 10 is comprised of a planar plate portion 70 formed nearly rectangular in top view, rectangular-column support bases 71 vertically protruding a predetermined height from the four corners of the plate portion 70, and cylindrical positioning pins 15 vertically protruding from the support bases 71. The spacer 10 is made integrating the plate portion 70, the support bases 71, and the positioning pins 15.

The spacer 10 is disposed between the transmission side circuit board 4 and the reception side circuit board 5 such that the lower positioning pins 15 are inserted into the positioning holes 16a of the transmission side circuit board 4 and the upper positioning pins 15 are inserted into the positioning holes 16b of the reception side circuit board 5.

Figure 14:
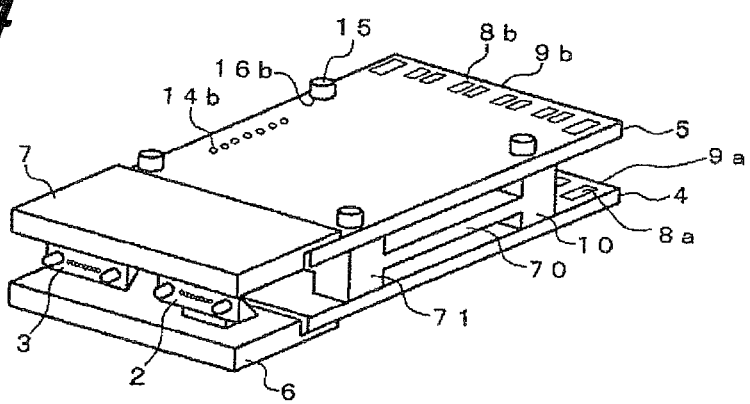
FIG. 14 is a perspective view showing the two circuit boards (with the spacer disposed therebetween) of the photoelectric conversion module in FIG. 1.

FIG. 14 shows the spacer 10 disposed between the transmission side circuit board 4 and the reception side circuit board 5 in perspective view.

The length between the upper face and the lower face of the support base 71 is set to be the same as a predetermined clearance to be retained between the transmission side circuit board 4 and the reception side circuit board 5 defined by the I/O interface standards. When the positioning pins 15 are each inserted into the positioning holes 16a, 16b of the transmission side circuit board 4 and the reception side circuit board 5 for setting the spacer 10 between the transmission side circuit board 4 and the reception side circuit board 5, the lower face of the support base 71 contacts the surface of the transmission side circuit board 4 and the upper face of the support base 71 contacts the surface of the reception side circuit board 5. Due to the length between the upper face and the lower face of the support base 71, the transmission side circuit board 4 and the reception side circuit board 5 are kept away from each other with the predetermined clearance.

By adjusting the height (i.e., the height between the upper face and the lower face) of the support base 71, the clearance of the vertical direction between the transmission side circuit board 4 and the reception side circuit board 5 can be adjusted.

The plate portion 70 has a wiring notched portion 11 for inserting the connector 13 therethrough. The wiring notched portion 11 is cut in the form of nearly rectangular in top view.

The length (i.e., the height from the upper face or lower face of the support base 71) of the positioning pins 15 is set to be more than the thickness of the transmission side circuit board 4 or the reception side circuit board 5. When the positioning pins 15 are each inserted into the positioning holes 16a, 16b of the transmission side circuit board 4 and the reception side circuit board 5 for setting the spacer 10 between the transmission side circuit board 4 and the reception side circuit board 5, the tip portion of the positioning pins 15 protrudes from the back surface of the transmission side circuit board 4 at the bottom side and protrudes from the back surface of the transmission side circuit board 4 at the top side.

The tip portion of the positioning pins 15 protruding from the back surface of the transmission side circuit board 4 is fitted into positioning holes 20 of the lower housing 19. The tip portion of the positioning pins 15 protruding from the back surface of the reception side circuit board 5 is fitted into positioning holes 20 of the upper housing 18. Thus, the positioning pins 15 of the spacer 10 are fitted into the positioning holes 20 of the upper housing 18 and the lower housing 19 such that the reception side circuit board 5 and the transmission side circuit board 4 are positioned relative to the upper housing 18 and the lower housing 19, respectively.

The spacer 10 is formed of a conductive member such as metals. For example, the spacer 10 is formed of zinc and manufactured by die-casting.

Optical Fiber Cable

The optical fiber cable 22 is comprised of eight transmission side optical fibers 51 and eight reception side optical fibers 53, and formed by bundling the sixteen optical fibers 51, 53.

As shown in FIGS. 1 to 3, the optical fiber cable 22 has at its end a resin protecting cover 23 for protecting the end of the optical fiber cable 22. The protecting cover 23 is formed with a rubber boot etc. The protecting cover 23 formed with the rubber boot can protect the optical fiber cable 22 in order not to bend the optical fibers 51, 53 more than an acceptable bending radius at the base of the protecting cover 23 when the optical fiber cable 22 is bent and pulled at 90 degrees. At the end of the protecting cover 23, a flange engaging portion 24 is integrally formed protruding from the end of the protecting over 23.

The optical fiber cable 22 is at the end divided into the eight transmission side optical fibers 51 and the eight reception side optical fibers 53. The eight transmission side optical fibers 51 have at the end the eight-core MT ferrule 52*a*. Likewise, the eight reception side optical fibers 53 have at the end the eight-core MT ferrule 52*b*.

Figure 8:
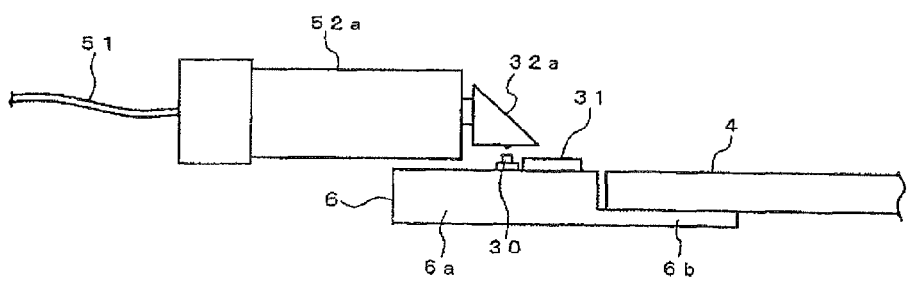
FIG. 8 is a side view showing the transmission side photoelectric conversion part with a transmission side optical fiber connected thereto.

As shown in FIG. 8, by fitting the fitting pins 35*a* of the lens block 32*a* into holes (not shown) formed in the MT ferrule 52*a*, the MT ferrule 52*a* at the end of the transmission side optical fibers 51 is connected to the lens block 32*a*. Thereby, the transmission side optical fiber 51 and the light-emitting element array 30 are optically coupled through the MT ferrule 52*a* and the lens block 32*a*.

Figure 11:
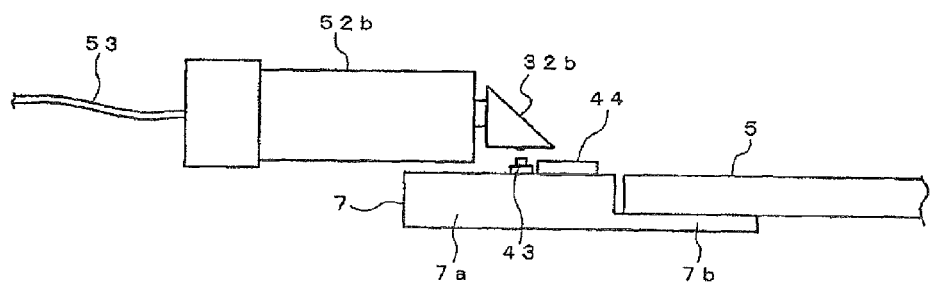
FIG. 11 is a side view showing the reception side photoelectric conversion part with a reception side optical fiber connected thereto.

Likewise, as shown in FIG. 11, by fitting the fitting pins 35*b* of the lens block 32*b* into holes (not shown) formed in the MT ferrule 52*b*, the MT ferrule 52*b* at the end of the reception side optical fibers 53 is connected to the lens block 32*b*. Thereby, the reception side optical fiber 53 and the light-receiving element array 43 are optically coupled through the MT ferrule 52*b* and the lens block 32*b*.

Housing/Upper Housing/Lower Housing

The photoelectric conversion module 1 is comprised of the housing 17 for encompassing the transmission side circuit board 4, the transmission side photoelectric conversion part 2, the reception side circuit board 5, and the reception side photoelectric conversion part 3.

As shown in FIGS. 1 to 3, the housing 17 is comprised of the upper housing 18 and the lower housing 19 which can be separated in the vertical direction. The upper housing 18 and the lower housing 19 are formed of a metal.

The upper housing 18 and the lower housing 19 have the positioning hole 20 into which the positioning pin 15 of the spacer 10 is fitted. The positioning pin 15 of the spacer 10 is fitted into the positioning holes 16*a*, 16*b* of the transmission side circuit board 4 and the reception side circuit board 5 and into the positioning holes 20 such that the transmission side circuit board 4 and the reception side circuit board 5 can be positioned relative to the housing 17.

The upper housing 18 and the lower housing 19 are each formed with a notched groove 25 for engaging the engaging portion 24 at the end of the optical fiber cable 22.

The upper housing 18 and the lower housing 19 are fixed to each other by means of fixing screws 26.

Assembly of Photoelectric Conversion Module

The assembly procedures for the photoelectric conversion module 1 of the embodiment will be described below.

The MT ferrule 52*a* of the transmission side optical fiber 51 of the optical fiber cable 22 is connected to the lens block 32*a* of the transmission side photoelectric conversion part 2 of the transmission side circuit board 4. Likewise, the MT ferrule 52*b* of the reception side optical fiber 53 of the optical fiber cable 22 is connected to the lens block 32*b* of the reception side photoelectric conversion part 3 of the reception side circuit board 5.

The conductor pins 12 of the connector 13 are inserted into the through-holes 14*a* of the transmission side circuit board 4 (See FIG. 12A).

The spacer 10 is disposed between the transmission side circuit board 4 and the reception side circuit board 5, and the positioning pins 15 of the spacer 10 protruding in the vertical direction are inserted into the positioning holes 16*a* of the transmission side circuit board 4 and into the positioning holes 16*b* of the reception side circuit board 5. The transmission side circuit board 4 and the reception side circuit board 5 are fitted to the spacer 10 such that the surface on which the transmission side photoelectric conversion part 2 of the transmission side circuit board 4 is mounted is opposite to the surface on which the reception side photoelectric conversion part 3 of the reception side circuit board 5 is mounted (See FIG. 14). Simultaneously, the conductor pins 12 of the connector 13 are inserted into the through-holes 14 of the reception side circuit board 5.

Then, the transmission side circuit board 4 and the reception side circuit board 5 are mounted on the lower housing 19 such that the tip portion of the positioning pins 15 protruding from the transmission side circuit board 4 is fitted into the positioning hole 20 of the lower housing 19. Here, as shown in FIGS. 1 and 3, a heat-dissipating sheet 21*a* as a heat-dissipating member is disposed on the back surface of the base member 6 of the transmission side circuit board 4. The base member 6 of the transmission side circuit board 4 contacts the lower housing 19 via the heat-dissipating sheet 21*a*.

Figure 15:
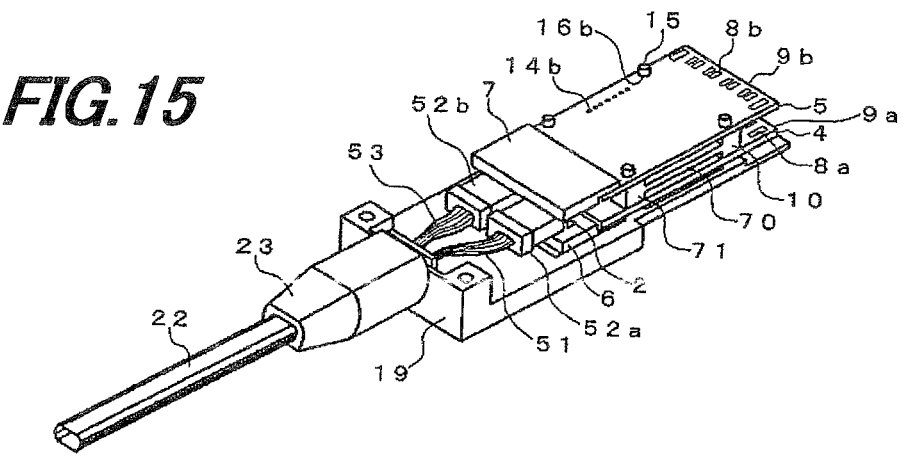
FIG. 15 is a perspective view showing a lower housing with the transmission side circuit board and the reception circuit board (with the spacer disposed therebetween) mounted thereon of the photoelectric conversion module in FIG. 1.

The edge of the notched groove 25 of the lower housing 19 is fitted with the groove of the flange engaging portion 24 at the end of the protecting cover 23 of the optical fiber cable 22 (See FIG. 15).

Then, the upper housing 18 is mounted on the lower housing 19 to cover the reception side circuit board 5. Here, the positioning holes 20 of the upper housing 18 are fitted with the tip portion of the positioning pins 15 protruding from the reception side circuit board 5. The edge of the notched groove 25 of the upper housing 18 is fitted with the groove of the flange engaging portion 24 at the end of the protecting cover 23 of the optical fiber cable 22. Also, as shown in FIGS. 1 to 3, a heat-dissipating sheet 21*b* as a heat-dissipating member is disposed on the back surface of the base member 7 of the reception side circuit board 5. The base member 7 of the reception side circuit board 5 contacts the upper housing 18 via the heat-dissipating sheet 21*b*.

The upper housing 18 and the lower housing 19 are fixed to each other by means of the fixing screws 26. Thereby, the photoelectric conversion module 1 can be completed (See FIG. 4).

Effects of the First Embodiment

The effects of the first embodiment will be described below.

The photoelectric conversion module 1 of the embodiment is constructed such that the transmission side photoelectric conversion part 2 is mounted off-center to one side of the transmission side circuit board 4 and, likewise, the reception side photoelectric conversion part 3 is mounted off-center to one side of the reception side circuit board 5, so that the surface on which the transmission side photoelectric conversion part 2 of the transmission side circuit board 4 is mounted is opposite to the surface on which the reception side photoelectric conversion part 3 of the reception side circuit board 5 is mounted.

Thereby, the transmission side photoelectric conversion part 2 and the reception side photoelectric conversion part 3 can be disposed parallel in the width direction without interfering with each other between the transmission side circuit board 4 and the reception side circuit board 5. This is an effective disposition for the case that the clearance between the transmission side circuit board 4 and the reception side circuit board 5 is determined due to the I/O interface standards etc. and, therefore, it is impossible to obtain a clearance for placing the transmission side photoelectric conversion part 2 and the reception side photoelectric conversion part 3 in the vertical direction.

Furthermore, the lens block 32a of the transmission side photoelectric conversion part 2 and the lens block 32b of the reception side photoelectric conversion part 3 are disposed parallel in the width direction between the transmission side circuit board 4 and the reception side circuit board 5.

Thereby, the lens block 32a of the transmission side photoelectric conversion part 2 and the lens block 32b of the reception side photoelectric conversion part 3 can be disposed in a space-saving design without interfering with each other between the transmission side circuit board 4 and the reception side circuit board 5.

The transmission side circuit board 4 has the positioning holes 16a formed therein, the reception side circuit board 5 has the positioning holes 16b formed therein, the spacer 10 with the support bases 71 and the positioning pins 15 protruding from the support bases 71 is disposed between the transmission side circuit board 4 and the reception side circuit board 5, and the positioning pins 15 of the spacer 10 are inserted and fitted into the positioning holes 16a of the transmission side circuit board 4 and into the positioning holes 16b of the reception side circuit board 5.

Thereby, the clearance between the transmission side circuit board 4 and the reception side circuit board 5 can be defined by the length (or height) between the upper face and the lower face of the support base 71 of the spacer 10. By adjusting the height (i.e., the height from the upper face to the lower face) of the support base 71, it is possible to suitably adjust the clearance between the transmission side circuit board 4 and the reception side circuit board 5 in the vertical direction.

Further, the positioning pins 15 of the spacer 10 are designed to have a length more than the thickness of the transmission side circuit board 4 or the reception side circuit board 5 such that the positioning pins 15 protrude from the back surface of the transmission side circuit board 4 or the reception side circuit board 5. The upper housing 18 and the lower housing 19 of the housing 17 each have the positioning holes 20 such that the positioning pins 15 of the spacer 10 can be fitted into the positioning holes 20 of the housing 17.

Thereby, the transmission side circuit board 4 and the reception side circuit board 5 can be positioned relative to the housing 17 by means of the spacer 10.

The spacer 10 has the planar plate portion 70, which is disposed between the transmission side circuit board 4 and the reception side circuit board 5. The spacer 10 is formed of a metal.

Thereby, the plate portion 70 of the spacer 10 serves as an electromagnetic shield between the transmission side circuit board 4 and the reception side circuit board 5 such that the crosstalk between high-frequency signals transmitted through the transmission side circuit board 4 and high-frequency signals transmitted through the reception side circuit board 5 can be reduced. Especially, where the transmission side circuit board 4 and the reception side circuit board 5 are disposed such that the surfaces are opposite on which the wiring pattern 38a, 38b are formed between the connecting terminals 8a, 8b and the photoelectric conversion part 2, 3, the electromagnetic shield between the wiring patterns 38a and 38b can be effectively provided by the plate portion 70 of the spacer 10.

Further, the spacer 10 has the wiring notched portion 11 formed for inserting therethrough the wiring member (i.e., the connector 13) for electrically connecting the transmission side circuit board 4 and the reception side circuit board 5.

Thereby, the transmission side circuit board 4 and the reception side circuit board 5 ca be electrically connected to each other by means of the wiring member (i.e., the connector 13) passing through the wiring notched portion 11 of the spacer 10.

The transmission side photoelectric conversion part 2 is mounted on the top surface of the base member 6 and a part of the top surface of the base member 6 is fixed to the back surface of the transmission side circuit board 4. Likewise, the reception side photoelectric conversion part 3 is mounted on the top surface of the base member 7 and a par of the top surface of the base member 7 is fixed to the back surface of the reception side circuit board 5. The transmission side circuit board 4 and the reception side circuit hoard 5 are encompassed in the housing 17 such that the top surfaces thereof are opposite to each other.

Thereby, heat generated at the transmission side photoelectric conversion part 2 can be dissipated through the base member 6 to the housing 17. Heat generated at the reception side photoelectric conversion part 3 can be dissipated through the base member 7 to the housing 17. Thus, heat generated at the transmission side photoelectric conversion part 2 and the reception side photoelectric conversion part 3 can be efficiently dissipated.

The base member 6, 7 is comprised of the plate base portion 6a, 7a and the extension portion 6b, 7b integrated with the base portion 6a, 7a, and having a thickness less than the base portion 6a, 7a. The base member 6, 7 is formed flat on the side of the back surface and stepwise between the base portion 6a, 7a and the extension portion 6b, 7b on the side of the top surface. The photoelectric conversion part (i.e., the transmission side photoelectric conversion part 2 or the reception side photoelectric conversion part 3) is mounted on the surface of the base portion 6a, 7a of the base member 6, 7. The back surface of the circuit board (i.e., the transmission side circuit board 4 or the reception side circuit board 5) is fixed to the surface of the extension portion 6b, 7b of the base member 6, 7.

Thereby, the photoelectric conversion parts 2, 3 can be mounted on one end of the circuit board 4, 5 to be on the side of the top surface of the circuit board 4, 5. Also, the base members 6, 7 can be disposed to be a heat dissipation route between the photoelectric conversion part 2, 3 and the housing 17 on the back side of the circuit board 4, 5.

The base members 6, 7 allow the surface level to be matched to each other between the photoelectric conversion part 2, 3 and the circuit board 4, 5, whereby the length of a wire for connecting the photoelectric conversion part 2, 3 and the wiring pattern on the surface of the circuit board 4, 5 can be decreased.

Further, the back surface of the base member 6, 7 contacts the housing 17 via the heat-dissipating sheet 21a, 21b.

Thereby, the base member 6, 7 is thermally connected to the housing through the heat-dissipating sheet 21a, 21b. Thus, heat generated at the transmission side photoelectric conversion part 2 and the reception side photoelectric conversion part 3 can be efficiently dissipated through the base members 6, 7 and the heat-dissipating sheets 21a, 21b to the housing 17.

Second Embodiment

The second embodiment according to the invention will be described below.

Figure 16A:
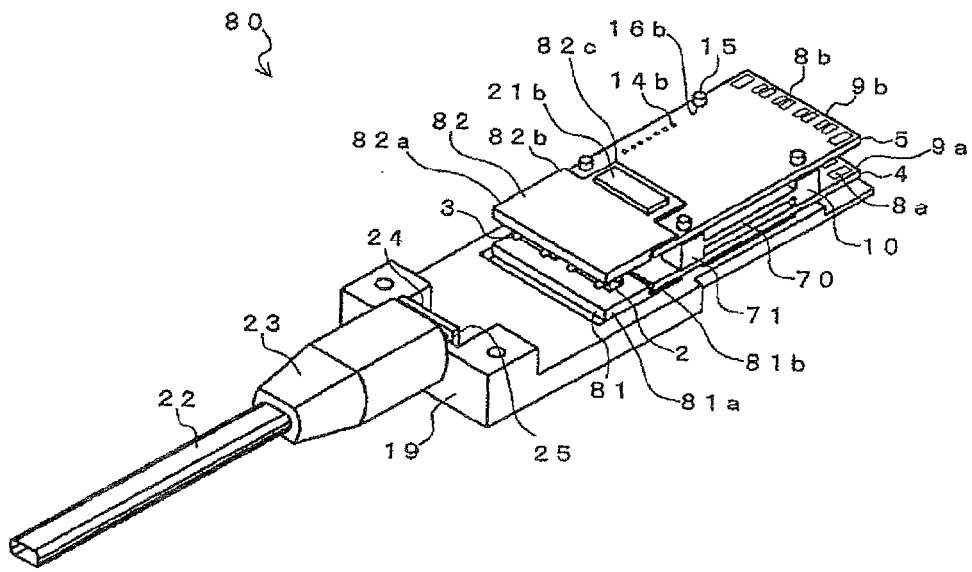

FIG. 16A shows the second embodiment of the invention. A photoelectric conversion module 80 in the second embodiment is, like the photoelectric conversion module 1 described above, constructed such that the transmission side circuit board 4 and the reception side circuit board 5 are vertically disposed via the spacer 10 and mounted on the lower housing 19, and the upper housing (not shown) is fixed to the lower housing 19.

The photoelectric conversion module 80 of the second embodiment is constructed such that a base member 81 fixed to the transmission side circuit board 4 and a base member 82 fixed to the reception side circuit board 5 are different in its shape from the base member 6 and 7 of the photoelectric conversion module 1.

Figure 16B:
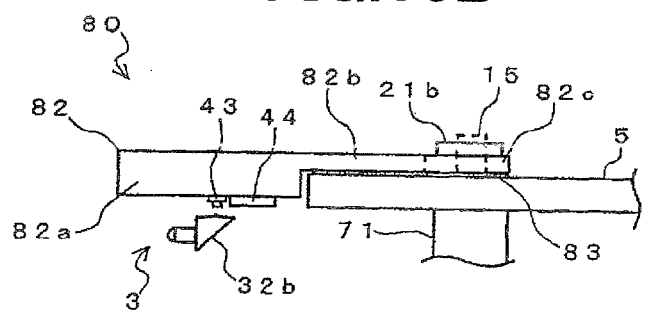
Figure 16C:
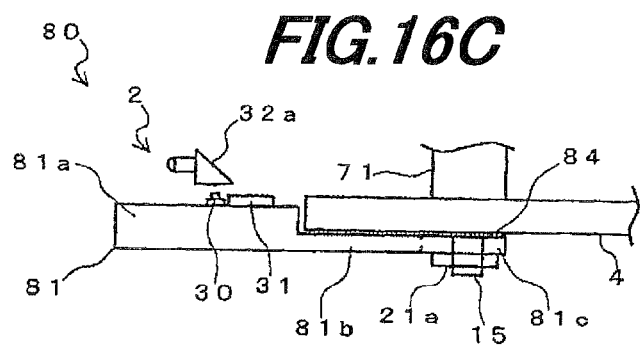
Figure 17:
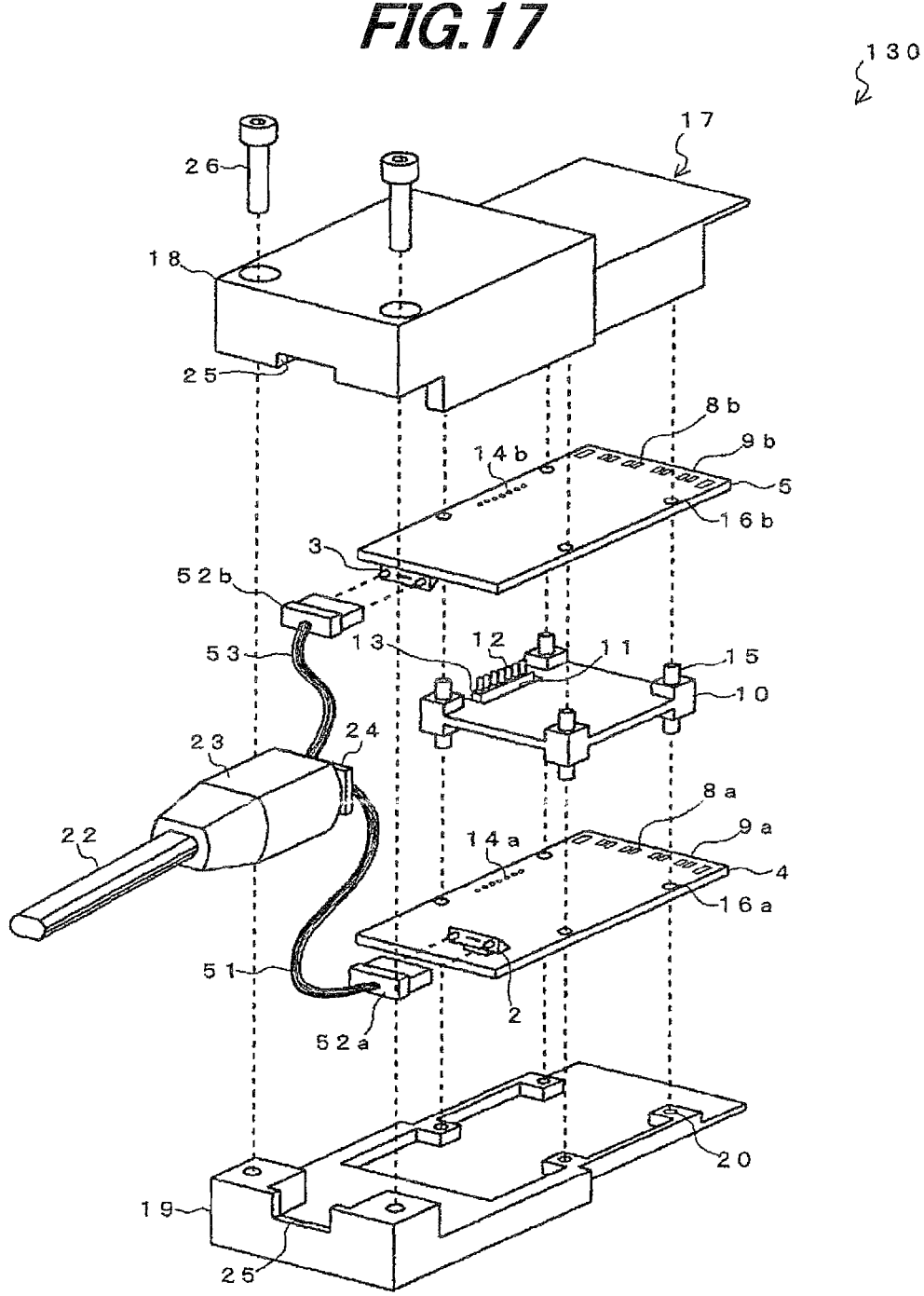
FIG. 17 is an exploded perspective view showing a photoelectric conversion module in a third preferred embodiment according to the invention.
Figure 18:
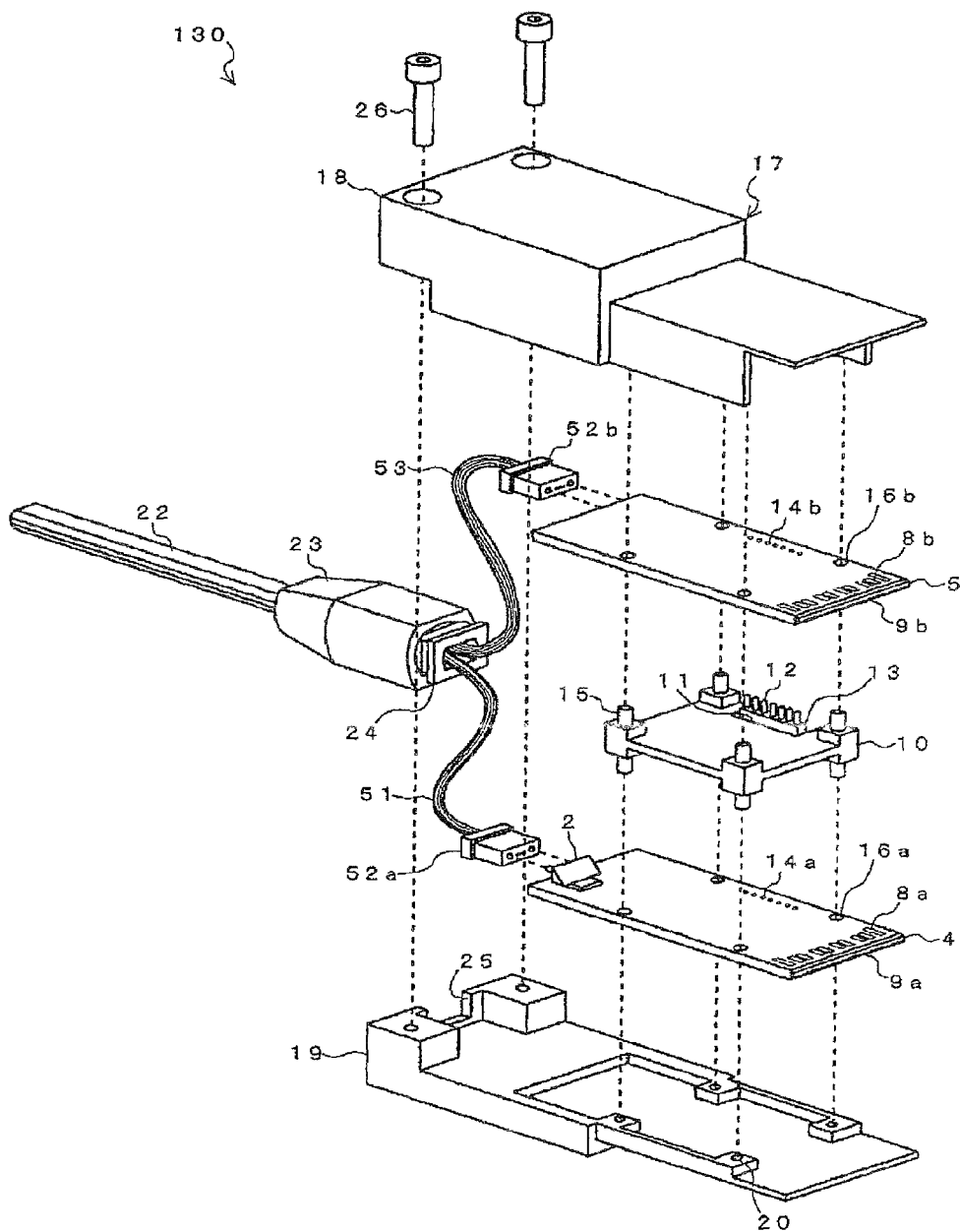
FIG. 18 is an exploded perspective view showing the photoelectric conversion module in FIG. 17 in another direction.
Figure 19:
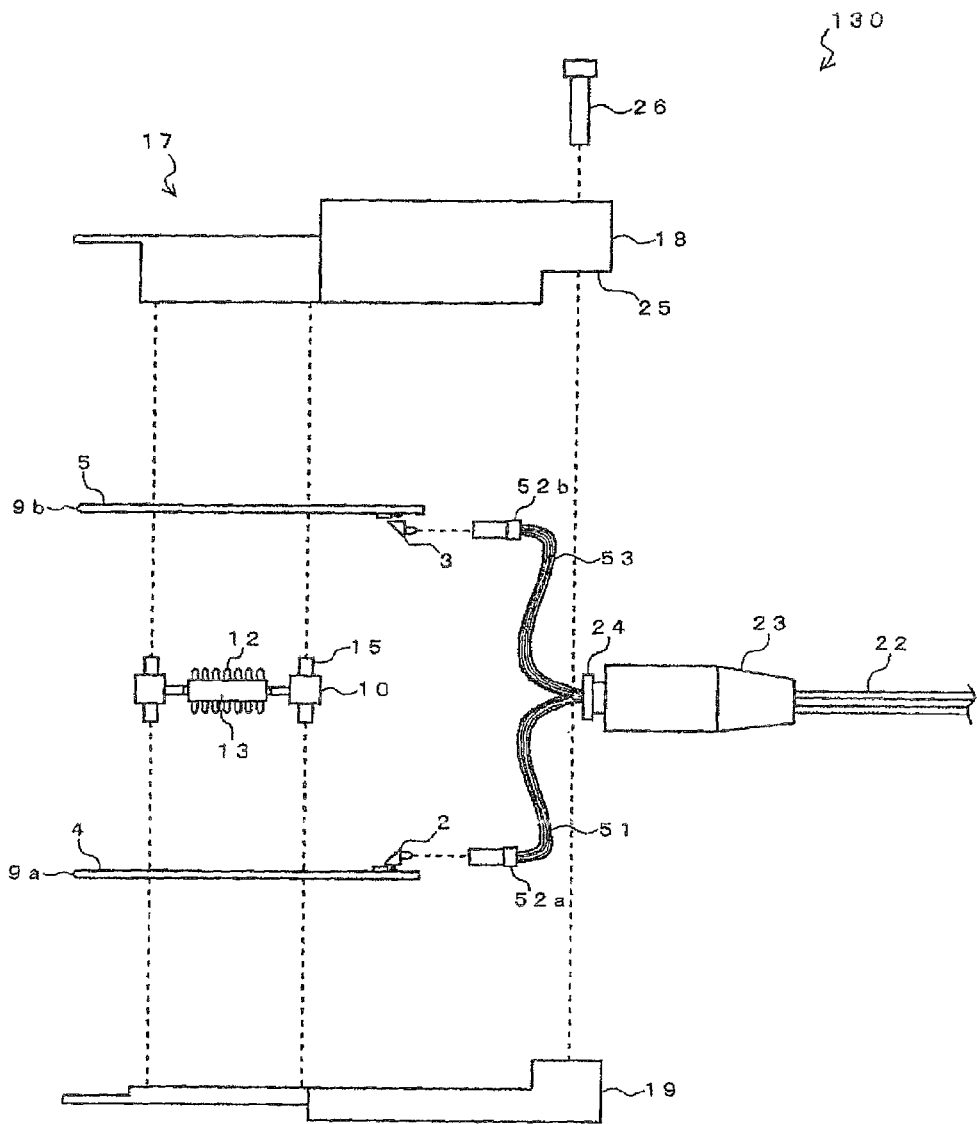
FIG. 19 is an exploded side view showing the photoelectric conversion module in FIG. 17.
Figure 20:
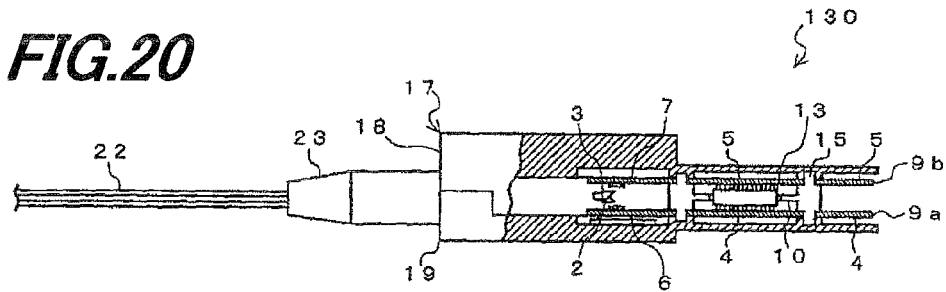
FIG. 20 is a partial cross sectional view showing the photoelectric conversion module in FIG. 17.

As shown in FIG. 16C, the base member 81 is comprised of a plate base portion 81a and an extension portion 81b integrated with the base portion 81a, extending from the lower part (i.e., a part on the bottom of the base portion 81a) of the base portion 81a, having a thickness less than the base portion 81a, and is formed nearly L-shaped in side view. The base member 81 is formed flat on the side of the back surface (downward in FIG. 16C) and stepwise between the base portion 81a and the extension portion 81b on the side of the top surface (upward in FIG. 16C).

Further, the base member 81 is comprised of a second extension portion 81c extending from the extension portion 81b to the support base 71 of the spacer 10 toward one end (i.e., the upper-right direction in FIG. 16A or rightward in FIG. 16C) of the transmission side circuit board 4. The second extension portion 81c has a width less than the extension portion 81b so as not to interfere with the positioning pins 15 protruding from the back surface of the transmission side circuit board 4. The top surface of the extension portion 81b and the second extension portion 81c is fixed to the back surface of the transmission side circuit board 4 by means of an adhesive 84.

When the transmission side circuit board 4 is mounted on the lower housing 19, the heat-dissipating sheet 21a is put on the back surface of the second extension portion 81c. When the upper housing is fixed to the lower housing 19 to complete the photoelectric conversion module 80, the second extension portion 81c and the heat-dissipating sheet 21a are sandwiched between the support base 71 and the lower housing 19 such that compression force is applied thereto in the vertical direction by the support base 71 and the lower housing 19.

Likewise, as shown in FIG. 16B, the base member 82 is comprised of a plate base portion 82a and an extension portion 82b integrated with the base portion 82a, extending from the lower part (i.e., a part on the bottom of the base portion 82a) of the base portion 82a, having a thickness less than the base portion 82a, and is formed nearly L-shaped in side view. The base member 82 is formed flat on the side of the back surface (upward in FIG. 16B) and stepwise between the base portion 82a and the extension portion 82b on the side of the top surface (downward in FIG. 16B).

Further, the base member 82 is comprised of a second extension portion 82c extending from the extension portion 82b to the support base 71 of the spacer 10 toward one end (i.e., the upper-right direction in FIG. 16A or rightward in FIG. 16B) of the reception side circuit board 5. The second extension portion 82c has a width less than the extension portion 82b so as not to interfere with the positioning pins 15 protruding from the back surface of the reception side circuit board 5. The top surface of the extension portion 82b and the second extension portion 82c is fixed to the back surface of the reception side circuit board 5 by means of an adhesive 83.

When the upper housing (not shown) is mounted on the reception side circuit board 5, the heat-dissipating sheet 21b is put on the back surface of the second extension portion 82c. When the upper housing is fixed to the lower housing 19 to complete the photoelectric conversion module 80, the second extension portion 82c and the heat-dissipating sheet 21b are sandwiched between the support base 71 and the upper housing such that compression force is applied thereto in the vertical direction by the support base 71 and the upper housing.

Effects of the Second Embodiment

The photoelectric conversion module 80 of the second embodiment is constructed such that the base member 81 fixed to one end of the transmission side circuit board 4 is provided with the second extension portion 81c extending to the position to be sandwiched between the support base 71 of the spacer 10 and the lower housing 19, and the base member 82 fixed to one end of the reception side circuit board 5 is provided with the second extension portion 82c extending to the position to be sandwiched between the support base 71 of the spacer 10 and the upper housing.

Thereby, to the second extension portions 81c and 82c of the base members 81 and 82 for the transmission side circuit board 4 and the reception side circuit board 5, respectively, compression force is applied by the support base 71 of the spacer 10 and the housing 17.

Thus, since the extension portions 81c and 82c of the base members 81 and 82, respectively, are fixedly sandwiched by the support base 71 of the spacer 10 and the housing 17 in the vertical direction, the transmission side circuit board 4 and the reception side circuit board 5 can be prevented from separating from the base members 81 and 82. Further, the extension portions 81c and 82c contacts tightly the housing 17 via the heat-dissipating sheets 21a, 21b such that the heat dissipation efficiency from the base members 81 and 82 to the housing 17 can be enhanced.

Third Embodiment

The third embodiment according to the invention will be described below.

FIGS. 17 to 25 show the third embodiment of the invention. A photoelectric conversion module 130 in the third embodiment has basically the same components as the photoelectric conversion module 1. The difference from the photoelectric conversion module 1 is made such that the base member 6 is omitted and the transmission side photoelectric conversion part 2 is mounted on the transmission side circuit board 4, and that the base member 7 is omitted and the reception side photoelectric conversion part 3 is mounted on the reception side circuit board 5.

Figure 21:
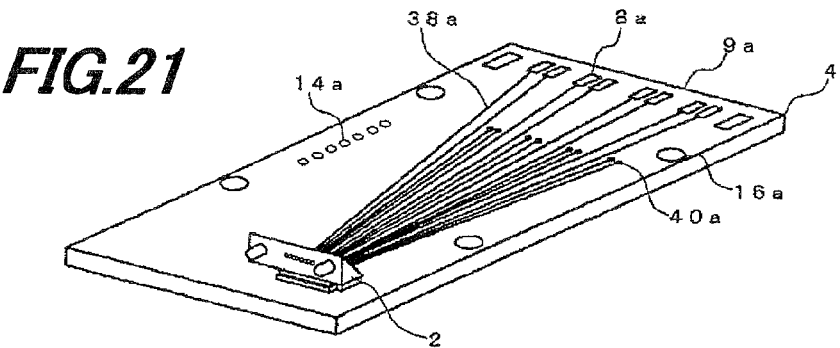
FIG. 21 is a perspective view (from above) showing a transmission side circuit board used in the photoelectric conversion module in FIG. 17.

As shown in FIG. 21, the transmission side photoelectric conversion part 2 is directly mounted at one end (i.e., at end on the lower-left side in FIG. 21) of the transmission side circuit board 4. The transmission side photoelectric conversion part 2 is mounted off-center to one side (i.e., a lower-right side in FIG. 21) in the width direction of the transmission side circuit board 4.

Figure 22:
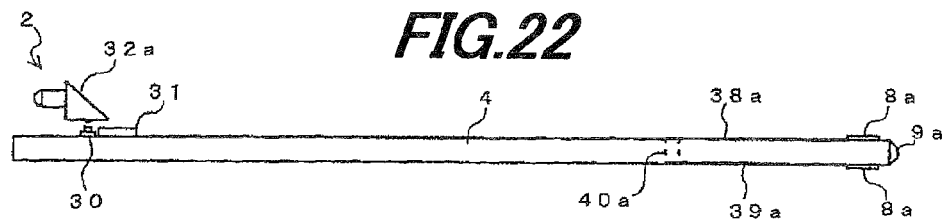
FIG. 22 is a side view showing the transmission side circuit board in FIG. 21.

As shown in FIG. 22, the wiring pattern 38a formed on the top surface of the transmission side circuit board 4 is electrically connected via the through-hole 40a to the wiring pattern 39a formed on the back surface of the transmission side circuit board 4.

Figure 23:
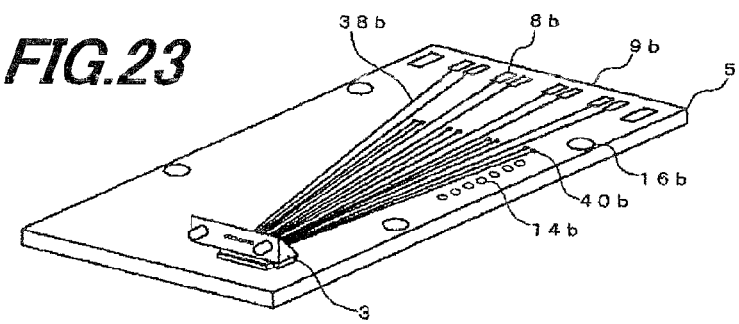
FIG. 23 is a perspective view (from above) showing a reception side circuit board used in the photoelectric conversion module in FIG. 17.

As shown in FIG. 23, the reception side photoelectric conversion part 3 is directly mounted at one end (i.e., at end on the lower-left side in FIG. 23) of the reception side circuit board 5. The reception side photoelectric conversion part 3 is mounted off-center to one side (i.e., a lower-right side in FIG. 23) in the width direction of the reception side circuit board 5.

Figure 24:
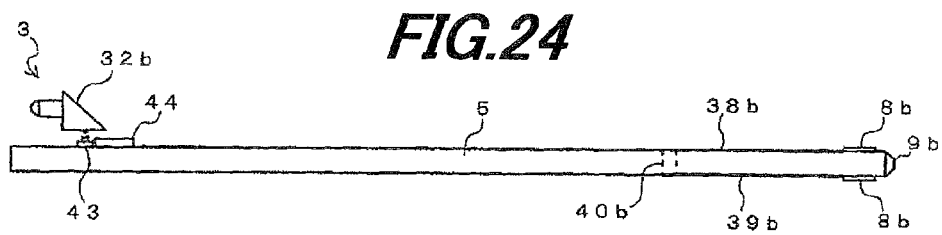
FIG. 24 is a side view showing the reception side circuit board in FIG. 23.

As shown in FIG. 24, the wiring pattern 38b formed on the top surface of the reception side circuit board 5 is electrically connected via the through-hole 40b to the wiring pattern 39b formed on the back surface of the reception side circuit board 5.

Figure 25:
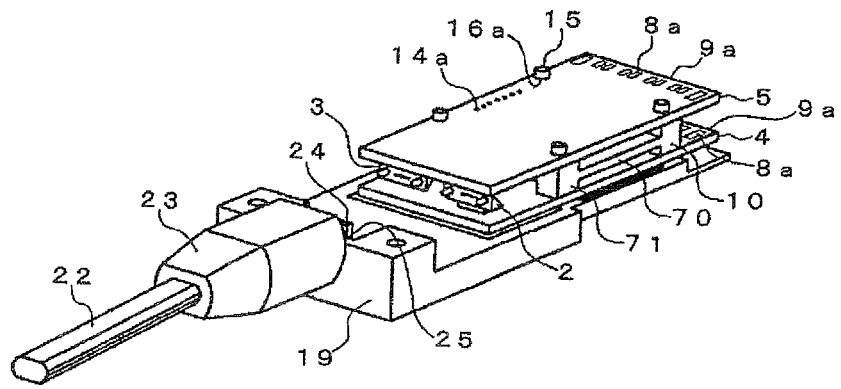
FIG. 25 is a perspective view showing a lower housing with the transmission side circuit board and the reception circuit board (with the spacer disposed therebetween) mounted thereon of the photoelectric conversion module in FIG. 17.

FIG. 25 is a perspective view showing the state that the spacer 10 is disposed between the transmission side circuit board 4 and the reception side circuit board 5, and the positioning pins 15 protruding from the back surface of the transmission side circuit board 4 is fitted into the positioning hole 20 of the lower housing 19.

Although the heat-dissipating sheet is omitted in FIGS. 17 to 20, the transmission side circuit board 4 and the reception side circuit board 5 are desirably thermally connected through the heat-dissipating sheet to the lower housing 19 or the upper housing 18. Thereby, heat generated at the transmission side photoelectric conversion part 2 can be dissipated through the transmission side circuit board 4 and the heat-dissipating sheet to the lower housing 19, and heat generated at the reception side photoelectric conversion part 3 can be dissipated through the reception side circuit board 5 and the heat-dissipating sheet to the upper housing 18.

In this case, the transmission side circuit board 4 and the reception side circuit board 5 are desirably formed of a material with a high thermal conductivity. Even when the transmission side circuit board 4 and the reception side circuit board 5 are formed of a material (e.g., glass epoxy) with a low thermal conductivity, heat generated at the photoelectric conversion part 2, 3 can be dissipated through the through-holes and the heat-dissipating sheet to the lower housing 19 or the upper housing 18 by providing the through-holes in the transmission side circuit board 4 and the reception side circuit board 5 at the position where the photoelectric conversion part 2, 3 is mounted.

The photoelectric conversion module 130 without the base member 6, 7 allows a simpler construction and a low cost.

MODIFICATIONS

Although in the above embodiments the engaging portion 24 of the protecting cover 23 of the optical fiber cable 22 is engaged with and fixed to the notched groove 25 of the housing 17, an optical connector may be attached at the end of the optical fiber cable 22 such that the optical fiber cable 22 can be attached to/detached from the housing 17 by an optical receptacle formed at the back face of the housing 17.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A photoelectric conversion module, comprising:
a transmission side photoelectric conversion part for converting an electrical signal into an optical signal;
a transmission side circuit board on which the transmission side photoelectric conversion part is mounted off-center to one side of the transmission side circuit board at one end of the transmission side circuit board;
a reception side photoelectric conversion part for converting an optical signal into an electrical signal; and
a reception side circuit board on which the reception side photoelectric conversion part is mounted off-center to one side of the reception side circuit board at one end of the reception side circuit board,
wherein a surface of the transmission side circuit board on which the transmission side photoelectric conversion part is mounted is opposite to a surface of the reception side circuit board on which the reception side photoelectric conversion part is mounted,
the transmission side photoelectric conversion part and the reception side photoelectric conversion part are located between the transmission side circuit board and the reception side circuit board, and the transmission side photoelectric conversion part and the reception side photoelectric conversion part are arranged in parallel in a width direction of each circuit board.

2. The photoelectric conversion module according to claim 1, wherein the transmission side photoelectric conversion part comprises a light-emitting element and a first lens block to which the light-emitting element is optically coupled for converting an optical path,
the reception side photoelectric conversion part comprises a light-receiving element and a second lens block to which the light-receiving element is optically coupled for covering an optical path, and
the first lens block of the transmission side photoelectric conversion part is disposed parallel to the second lens block of the reception side photoelectric conversion part.

3. The photoelectric conversion module according to claim 1, further comprising:
a first base member fixed to the one end of the transmission side circuit board, for mounting thereon the transmission side photoelectric conversion part off-center to the one side of the transmission side circuit board; and
a second base member fixed to the one end of the reception side circuit board, for mounting thereon the reception side photoelectric conversion part off-center to the one side of the reception side circuit board.

4. The photoelectric conversion module according to claim 1, wherein the transmission side circuit board comprises a first card edge connector with a connecting terminal at another end thereof,
the reception side circuit board comprises a second card edge connector with a connecting terminal at another end thereof, and
the first card edge connector and the second card edge connector form a double card edge connector in a vertical direction.

5. The photoelectric conversion module according to claim 1, further comprising:
a spacer that is disposed between the transmission side circuit board and the reception side circuit board, for retaining a predetermined clearance therebetween.

* * * * *